(12) United States Patent
Levi et al.

(10) Patent No.: US 11,411,911 B2
(45) Date of Patent: Aug. 9, 2022

(54) ROUTING ACROSS MULTIPLE SUBNETWORKS USING ADDRESS MAPPING

(71) Applicant: Mellanox Technologies TLV Ltd., Raanana (IL)

(72) Inventors: Lion Levi, Yavne (IL); Vladimir Koushnir, Rishon le Zion (IL); Matty Kadosh, Hadera (IL); Gil Bloch, Zichron Yaakov (IL); Aviad Levy, Ge'alya (IL); Liran Liss, Atzmon (IL); Dvir Libhaber, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 45 days.

(21) Appl. No.: 17/079,543

(22) Filed: Oct. 26, 2020

(65) Prior Publication Data
US 2022/0131826 A1 Apr. 28, 2022

(51) Int. Cl.
*H04L 61/103* (2022.01)
*H04L 45/02* (2022.01)

(52) U.S. Cl.
CPC ............ *H04L 61/103* (2013.01); *H04L 45/02* (2013.01)

(58) Field of Classification Search
CPC .................... H04L 61/103; H04L 45/02
See application file for complete search history.

(56) References Cited

U.S. PATENT DOCUMENTS

| | | |
|---|---|---|
| 4,312,064 A | 1/1982 | Bench et al. |
| 6,115,385 A | 9/2000 | Vig |
| 6,169,741 B1 | 1/2001 | Lemaire et al. |
| 6,480,500 B1 | 11/2002 | Erimli et al. |
| 6,532,211 B1 | 3/2003 | Rathonyi et al. |
| 6,553,028 B1 | 4/2003 | Tang et al. |
| 6,614,758 B2 | 9/2003 | Wong |
| 6,665,297 B1 | 12/2003 | Harigochi et al. |
| 6,775,268 B1 | 8/2004 | Wang et al. |
| 6,795,886 B1 | 9/2004 | Nguyen |
| 6,804,532 B1 | 10/2004 | Moon et al. |

(Continued)

FOREIGN PATENT DOCUMENTS

| | | |
|---|---|---|
| WO | 2012037494 A1 | 3/2012 |
| WO | 2016105446 A1 | 6/2016 |

OTHER PUBLICATIONS

Kim et al, "Technology-Driven, Highly-Scalable Dragonfly Topology", 35th International Symposium on Computer Architecture, pp. 77-79 (2008). (Year: 2008).*

(Continued)

*Primary Examiner* — Jamal Javaid
*Assistant Examiner* — Shawn D Miller
(74) *Attorney, Agent, or Firm* — Kligler & Associates Patent Attorneys Ltd

(57) ABSTRACT

A router includes routing circuitry and a plurality of ports. The routing circuitry is configured to receive from a first subnetwork, via one of the ports, a packet destined to be delivered to a target node located in a second subnetwork, to select a mapping, from among two or more mappings, depending on a topological relation between the first subnetwork and the second subnetwork, to map a Layer-3 address of the packet into a Layer-2 address using the selected mapping, and to forward the packet via another one of the ports to the Layer-2 address.

26 Claims, 7 Drawing Sheets

(56) References Cited

U.S. PATENT DOCUMENTS

| | | |
|---|---|---|
| 6,807,175 B1 | 10/2004 | Jennings et al. |
| 6,831,918 B1 | 12/2004 | Kavak |
| 6,912,589 B1 | 6/2005 | Jain et al. |
| 6,912,604 B1 | 6/2005 | Tzeng et al. |
| 6,950,428 B1 | 9/2005 | Horst et al. |
| 7,010,607 B1 | 3/2006 | Bunton |
| 7,076,569 B1 | 7/2006 | Bailey et al. |
| 7,221,676 B2 | 5/2007 | Green et al. |
| 7,234,001 B2 | 6/2007 | Simpson et al. |
| 7,274,869 B1 | 9/2007 | Pan et al. |
| 7,286,535 B2 | 10/2007 | Ishikawa et al. |
| 7,401,157 B2 | 7/2008 | Costantino et al. |
| 7,676,597 B2 | 3/2010 | Kagan et al. |
| 7,746,854 B2 | 6/2010 | Ambe et al. |
| 7,899,930 B1 | 3/2011 | Turner et al. |
| 7,924,837 B1 | 4/2011 | Shabtay et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,570,865 B2 | 10/2013 | Goldenberg et al. |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,625,427 B1 | 1/2014 | Terry et al. |
| 8,681,641 B1 | 3/2014 | Sajassi et al. |
| 8,755,389 B1 | 6/2014 | Poutievski et al. |
| 8,774,063 B2 | 7/2014 | Beecroft |
| 8,867,356 B2 | 10/2014 | Bloch et al. |
| 8,873,567 B1 | 10/2014 | Mandal et al. |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,137,143 B2 | 9/2015 | Parker et al. |
| 9,231,888 B2 | 1/2016 | Bogdanski et al. |
| 9,264,382 B2 * | 2/2016 | Bogdanski ............... H04L 49/35 |
| 9,385,949 B2 | 7/2016 | Vershkov et al. |
| 9,544,185 B1 | 1/2017 | Yadav et al. |
| 9,548,960 B2 | 1/2017 | Haramaty et al. |
| 9,571,400 B1 | 2/2017 | Mandal et al. |
| 9,729,473 B2 | 8/2017 | Haramaty et al. |
| 10,200,294 B2 | 2/2019 | Shpiner et al. |
| 10,644,995 B2 | 5/2020 | Levy et al. |
| 2001/0043564 A1 | 11/2001 | Bloch et al. |
| 2001/0043614 A1 | 11/2001 | Viswanadham et al. |
| 2002/0009073 A1 | 1/2002 | Furukawa et al. |
| 2002/0013844 A1 | 1/2002 | Garrett et al. |
| 2002/0026525 A1 | 2/2002 | Armitage |
| 2002/0039357 A1 | 4/2002 | Lipasti et al. |
| 2002/0071439 A1 | 6/2002 | Reeves et al. |
| 2002/0085586 A1 | 7/2002 | Tzeng |
| 2002/0136163 A1 | 9/2002 | Kawakami et al. |
| 2002/0138645 A1 | 9/2002 | Shinomiya et al. |
| 2002/0141412 A1 | 10/2002 | Wong |
| 2002/0165897 A1 | 11/2002 | Kagan et al. |
| 2002/0176363 A1 | 11/2002 | Durinovic-Johri et al. |
| 2003/0016624 A1 | 1/2003 | Bare |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0097438 A1 | 5/2003 | Bearden et al. |
| 2003/0223453 A1 | 12/2003 | Stoler et al. |
| 2004/0024903 A1 | 2/2004 | Costatino et al. |
| 2004/0062242 A1 | 4/2004 | Wadia et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0154790 A1 | 7/2005 | Nagata et al. |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1 | 6/2006 | See et al. |
| 2006/0182034 A1 | 8/2006 | Klinker et al. |
| 2006/0215645 A1 | 9/2006 | Kangyu |
| 2006/0291480 A1 | 12/2006 | Cho et al. |
| 2007/0030817 A1 | 2/2007 | Arunachalam et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0104192 A1 | 5/2007 | Yoon et al. |
| 2007/0183418 A1 | 8/2007 | Riddoch et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0101378 A1 | 5/2008 | Krueger |
| 2008/0112413 A1 | 5/2008 | Pong |
| 2008/0165797 A1 | 7/2008 | Aceves |
| 2008/0186981 A1 | 8/2008 | Seto et al. |
| 2008/0189432 A1 | 8/2008 | Abali et al. |
| 2008/0267078 A1 | 10/2008 | Farinacci et al. |
| 2008/0298248 A1 | 12/2008 | Roeck et al. |
| 2009/0010159 A1 | 1/2009 | Brownell et al. |
| 2009/0022154 A1 | 1/2009 | Kiribe et al. |
| 2009/0097496 A1 | 4/2009 | Nakamura et al. |
| 2009/0103534 A1 | 4/2009 | Malledant et al. |
| 2009/0119565 A1 | 5/2009 | Park et al. |
| 2009/0262741 A1 | 10/2009 | Jungck et al. |
| 2010/0020796 A1 | 1/2010 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0216444 A1 | 8/2010 | Mariniello et al. |
| 2010/0284404 A1 | 11/2010 | Gopinath et al. |
| 2010/0290385 A1 | 11/2010 | Ankaiah et al. |
| 2010/0290458 A1 | 11/2010 | Assarpour et al. |
| 2010/0315958 A1 | 12/2010 | Luo et al. |
| 2011/0019673 A1 | 1/2011 | Fernandez |
| 2011/0080913 A1 | 4/2011 | Liu et al. |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0164496 A1 | 7/2011 | Loh et al. |
| 2011/0164518 A1 | 7/2011 | Daraiseh et al. |
| 2011/0225391 A1 | 9/2011 | Burroughs et al. |
| 2011/0249679 A1 | 10/2011 | Lin et al. |
| 2011/0255410 A1 | 10/2011 | Yamen et al. |
| 2011/0265006 A1 | 10/2011 | Morimura et al. |
| 2011/0299529 A1 | 12/2011 | Olsson et al. |
| 2012/0020207 A1 | 1/2012 | Corti et al. |
| 2012/0075999 A1 | 3/2012 | Ko et al. |
| 2012/0082057 A1 | 4/2012 | Welin et al. |
| 2012/0144065 A1 | 6/2012 | Parker et al. |
| 2012/0147752 A1 | 6/2012 | Ashwood-Smith et al. |
| 2012/0163797 A1 | 6/2012 | Wang |
| 2012/0170582 A1 | 7/2012 | Abts et al. |
| 2012/0207175 A1 | 8/2012 | Raman et al. |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0159548 A1 | 6/2013 | Vasseur et al. |
| 2013/0170451 A1 | 7/2013 | Krause et al. |
| 2013/0182604 A1 | 7/2013 | Moreno et al. |
| 2013/0204933 A1 | 8/2013 | Cardona et al. |
| 2013/0208720 A1 | 8/2013 | Ellis et al. |
| 2013/0242745 A1 | 9/2013 | Umezuki |
| 2013/0259033 A1 | 10/2013 | Hefty |
| 2013/0297757 A1 | 11/2013 | Han et al. |
| 2013/0315237 A1 | 11/2013 | Kagan et al. |
| 2013/0322256 A1 | 12/2013 | Bader et al. |
| 2013/0329727 A1 | 12/2013 | Rajagopalan et al. |
| 2013/0336116 A1 | 12/2013 | Vasseur et al. |
| 2013/0336164 A1 | 12/2013 | Yang et al. |

(56) References Cited

U.S. PATENT DOCUMENTS

| | | |
|---|---|---|
| 2014/0016457 A1 | 1/2014 | Enyedi et al. |
| 2014/0022942 A1 | 1/2014 | Han et al. |
| 2014/0043959 A1 | 2/2014 | Owens et al. |
| 2014/0059440 A1 | 2/2014 | Sasaki et al. |
| 2014/0105034 A1 | 4/2014 | Sun |
| 2014/0140341 A1 | 5/2014 | Bataineh et al. |
| 2014/0169173 A1 | 6/2014 | Naouri et al. |
| 2014/0192646 A1 | 7/2014 | Mir et al. |
| 2014/0198636 A1 | 7/2014 | Thayalan et al. |
| 2014/0211808 A1 | 7/2014 | Koren et al. |
| 2014/0269305 A1 | 9/2014 | Nguyen |
| 2014/0313880 A1 | 10/2014 | Lu et al. |
| 2014/0328180 A1 | 11/2014 | Kim et al. |
| 2014/0343967 A1 | 11/2014 | Baker |
| 2015/0030033 A1 | 1/2015 | Vasseur et al. |
| 2015/0052252 A1 | 2/2015 | Gilde et al. |
| 2015/0092539 A1 | 4/2015 | Sivabalan et al. |
| 2015/0098466 A1* | 4/2015 | Haramaty .............. H04L 45/16 370/392 |
| 2015/0124815 A1 | 5/2015 | Beliveau et al. |
| 2015/0127797 A1 | 5/2015 | Attar et al. |
| 2015/0131663 A1 | 5/2015 | Brar et al. |
| 2015/0163144 A1 | 6/2015 | Koponen et al. |
| 2015/0172070 A1 | 6/2015 | Csaszar |
| 2015/0194215 A1 | 7/2015 | Douglas et al. |
| 2015/0195204 A1 | 7/2015 | Haramaty et al. |
| 2015/0249590 A1 | 9/2015 | Gusat et al. |
| 2015/0295858 A1 | 10/2015 | Chrysos et al. |
| 2015/0372916 A1 | 12/2015 | Haramaty et al. |
| 2016/0012004 A1 | 1/2016 | Arimilli et al. |
| 2016/0014636 A1 | 1/2016 | Bahr et al. |
| 2016/0028613 A1 | 1/2016 | Haramaty et al. |
| 2016/0043933 A1 | 2/2016 | Gopalarathnam |
| 2016/0080120 A1 | 3/2016 | Unger et al. |
| 2016/0080321 A1 | 3/2016 | Pan et al. |
| 2016/0182378 A1 | 6/2016 | Basavaraja et al. |
| 2016/0294715 A1 | 10/2016 | Raindel et al. |
| 2016/0380893 A1* | 12/2016 | Chopra .................. H04L 45/74 370/392 |
| 2017/0054445 A1 | 2/2017 | Wang |
| 2017/0054591 A1 | 2/2017 | Hyoudou et al. |
| 2017/0068669 A1 | 3/2017 | Levy et al. |
| 2017/0070474 A1 | 3/2017 | Haramaty et al. |
| 2017/0180243 A1 | 6/2017 | Haramaty et al. |
| 2017/0187614 A1 | 6/2017 | Haramaty et al. |
| 2017/0244630 A1 | 8/2017 | Levy et al. |
| 2017/0270119 A1 | 9/2017 | Kfir et al. |
| 2017/0286292 A1 | 10/2017 | Levy et al. |
| 2017/0331740 A1 | 11/2017 | Levy et al. |
| 2017/0358111 A1 | 12/2017 | Madsen |
| 2018/0026878 A1 | 1/2018 | Zahavi et al. |
| 2018/0062990 A1 | 3/2018 | Kumar et al. |
| 2018/0089127 A1 | 3/2018 | Flajslik et al. |
| 2018/0139132 A1 | 5/2018 | Edsall et al. |
| 2018/0302288 A1 | 10/2018 | Schmatz |
| 2020/0042667 A1 | 2/2020 | Swaminathan et al. |
| 2020/0067822 A1 | 2/2020 | Malhotra et al. |
| 2020/0136956 A1* | 4/2020 | Neshat .................... H04L 45/28 |

OTHER PUBLICATIONS

Leiserson, C E., "Fat-Trees: Universal Networks for Hardware Efficient Supercomputing", IEEE Transactions on Computers, vol. C-34, No. 10, pp. 892-901, Oct. 1985.

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.

Matsuoka S., "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, Jun. 21-25, 2008.

Jiang et al., "Indirect Adaptive Routing on Large Scale Interconnection Networks", 36th International Symposium on Computer Architecture, pp. 220-231, Austin, USA, Jun. 20-24, 2009.

Minkenberg et al., "Adaptive Routing in Data Center Bridges", Proceedings of 17th IEEE Symposium on High Performance Interconnects, New York, USA, pp. 33-41, Aug. 25-27, 2009.

Kim et al., "Adaptive Routing in High-Radix Clos Network", Proceedings of the 2006 ACM/IEEE Conference on Supercomputing (SC2006), Tampa, USA, Nov. 2006.

Infiniband Trade Association, "InfiniBandTM Architecture Specification vol. 1", Release 1.2.1, Nov. 2007.

Culley et al., "Marker PDU Aligned Framing for TCP Specification", IETF Network Working Group, RFC 5044, Oct. 2007.

Shah et al., "Direct Data Placement over Reliable Transports", IETF Network Working Group, RFC 5041, Oct. 2007.

Martinez et al., "Supporting fully adaptive routing in Infiniband networks", Proceedings of the International Parallel and Distributed Processing Symposium (IPDPS'03),Apr. 22-26, 2003.

Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.

Gusat et al., "R3C2: Reactive Route & Rate Control for CEE", Proceedings of 18th IEEE Symposium on High Performance Interconnects, New York, USA, pp. 50-57, Aug. 10-27, 2010.

Wu et al., "DARD: Distributed adaptive routing datacenter networks", Proceedings of IEEE 32nd International Conference Distributed Computing Systems, pp. 32-41, Jun. 18-21, 2012.

Ding et al., "Level-wise scheduling algorithm for fat tree interconnection networks", Proceedings of the 2006 ACM/IEEE Conference on Supercomputing (SC 2006), 9 pages, Nov. 2006.

Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.

Li et al., "Multicast Replication Using Dual Lookups in Large Packet-Based Switches", 2006 IET International Conference on Wireless, Mobile and Multimedia Networks, , pp. 1-3, Nov. 6-9, 2006.

Nichols et al., "Definition of the Differentiated Services Field (DS Field) in the IPv4 and IPv6 Headers", Network Working Group, RFC 2474, 20 pages, Dec. 1998.

Microsoft., "How IPv4 Multicasting Works", 22 pages, Mar. 28, 2003.

Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.

IEEE 802.1Q, "IEEE Standard for Local and metropolitan area networks Virtual Bridged Local Area Networks", IEEE Computer Society, 303 pages, May 19, 2006.

Plummer, D., "An Ethernet Address Resolution Protocol," Network Working Group ,Request for Comments (RFC) 826, 10 pages, Nov. 1982.

Hinden et al., "IP Version 6 Addressing Architecture," Network Working Group ,Request for Comments (RFC) 2373, 26 pages, Jul. 1998.

Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.

Dally et al., "Deadlock-Free Message Routing in Multiprocessor Interconnection Networks", IEEE Transactions on Computers, vol. C-36, No. 5, May 1987, pp. 547-553.

(56) References Cited

OTHER PUBLICATIONS

Nkposong et al., "Experiences with BGP in Large Scale Data Centers:Teaching an old protocol new tricks", 44 pages, Jan. 31, 3014.
"Equal-cost multi-path routing", Wikipedia, 2 pages, Oct. 13, 2014.
Thaler et al., "Multipath Issues in Unicast and Multicast Next-Hop Selection", Network Working Group, RFC 2991, 9 pages, Nov. 2000.
Glass et al., "The turn model for adaptive routing", Journal of the ACM, vol. 41, No. 5, pp. 874-903, Sep. 1994.
Mahalingam et al., "VXLAN: A Framework for Overlaying Virtualized Layer 2 Networks over Layer 3 Networks", Internet Draft, 20 pages, Aug. 22, 2012.
Sinha et al., "Harnessing TCP's Burstiness with Flowlet Switching", 3rd ACM SIGCOMM Workshop on Hot Topics in Networks (HotNets), 6 pages, Nov. 11, 2004.
Vishnu et al., "Hot-Spot Avoidance With Multi-Pathing Over InfiniBand: An MPI Perspective", Seventh IEEE International Symposium on Cluster Computing and the Grid (CCGrid'07), 8 pages, year 2007.
NOWLAB—Network Based Computing Lab, 2 pages, years 2002-2015 http://nowlab.cse.ohio-state.edu/publications/conf-presentations/2007/vishnu-ccgrid07.pdf.
Alizadeh et al.,"CONGA: Distributed Congestion-Aware Load Balancing for Datacenters", Cisco Systems, 12 pages, Aug. 9, 2014.
Geoffray et al., "Adaptive Routing Strategies for Modern High Performance Networks", 16th IEEE Symposium on High Performance Interconnects (HOTI '08), pp. 165-172, Aug. 26-28, 2008.
Anderson et al., "On the Stability of Adaptive Routing in the Presence of Congestion Control", IEEE INFOCOM, 11 pages, 2003.
Perry et al., "Fastpass: A Centralized "Zero-Queue" Datacenter Network", M.I.T. Computer Science & Artificial Intelligence Lab, 12 pages, year 2014.
Afek et al., "Sampling and Large Flow Detection in SDN", SIGCOMM '15, pp. 345-346, Aug. 17-21, 2015, London, UK.
Amante et al., "IPv6 Flow Label Specification", Request for Comments: 6437, 15 pages, Nov. 2011.
Shpigelman et al, U.S. Appl. No. 16/240,749, filed Jan. 6, 2019.
Shpiner et al., "Dragonfly+: Low Cost Topology for Scaling Datacenters", IEEE 3rd International Workshop on High-Performance Interconnection Networks in the Exascale and Big-Data Era (HiPINEB), pp. 1-9, Feb. 2017.
Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 29-30, 2012.
MELLANOX White Paper, "The SHIELD: Self-Healing Interconnect," pp. 1-2, year 2019.
Cao et al., "Implementation Method for High-radix Fat-tree Deterministic Source-routing Interconnection Network", Computer Science ,vol. 39, Issue 12, pp. 33-37, 2012.
Yallouz et al., U.S. Appl. No. 17/016,464, filed Sep. 10, 2020.
Valadarsky et al., "Xpander: Towards Optimal-Performance Datacenters," Proceedings of CoNEXT '16, pp. 205-219, Dec. 2016.
Bilu et al., "Lifts, Discrepancy and Nearly Optimal Spectral Gap*," Combinatorica, vol. 26, No. 5, Bolyai Society—Springer-Verlag, pp. 495-519, year 2006.
U.S. Appl. No. 17/016,464 Office Action dated May 10, 2022.
Cisco, "Cisco ACI Remote Leaf Architecture—White Paper," pp. 1-83, Jan. 22, 2020.
EP Application # 21204582.7 Search Report dated Mar. 18, 2022.

* cited by examiner

ROUTING ACROSS MULTIPLE SUBNETWORKS USING ADDRESS MAPPING

TECHNICAL FIELD

Embodiments described herein relate generally to communication systems, and particularly to methods and systems for routing data packets across multiple subnetworks.

BACKGROUND

Routers are commonly used to forward data packets among subnets of a Layer-3 network. (A subnet, short for subnetwork, is a logical subdivision of a Layer-3 network.) Network ports of nodes within a given subnet share the same Layer-3 network address prefix.

Methods for routing packets between subnetworks and for assigning Layer-2 addresses are known in the art. For example, U.S. Pat. No. 9,548,960 whose disclosure is incorporated herein by reference, describes a method for communication that includes routing unicast data packets among nodes in a network using respective Layer-3 addresses that are uniquely assigned to each of the nodes. Respective Layer-2 unicast addresses are assigned to the nodes in accordance with an algorithmic address mapping of the respective Layer-3 addresses. The unicast data packets are forwarded within subnets of the network using the assigned Layer-2 addresses.

U.S. Pat. No. 9,385,949 describes a method for communication in a packet data network that includes at least first and second subnets interconnected by multiple routers and having respective first and second subnet managers. The method includes assigning respective local identifiers to ports for addressing of data link traffic within each subnet, such that the first subnet manager assigns the local identifiers in the first subnet, and the second subnet manager assigns the local identifiers in the second subnet. The routers are configured by transmitting and receiving control traffic between the subnet managers and the routers. Data packets are transmitted between network nodes in the first and second subnets via one or more of the configured routers under control of the subnet managers.

SUMMARY

An embodiment that is described herein provides a router that includes routing circuitry and a plurality of ports. The routing circuitry is configured to receive from a first subnetwork, via one of the ports, a packet destined to be delivered to a target node located in a second subnetwork, to select a mapping, from among two or more mappings, depending on a topological relation between the first subnetwork and the second subnetwork, to map a Layer-3 address of the packet into a Layer-2 address using the selected mapping, and to forward the packet via another one of the ports to the Layer-2 address.

In some embodiments, the routing circuitry is configured to select a first mapping when the first subnetwork is connected directly by the router to the second subnetwork, and to select a second mapping, different from the first mapping, when at least one intermediate subnetwork separates between the first subnetwork and the second subnetwork. In other embodiments, the routing circuitry is configured to select the first mapping by selecting a mapping that maps the Layer-3 address into a Layer-2 address preassigned to the target node in the second subnetwork. In yet other embodiments, the router connects via an intermediate subnetwork to an intermediate router that connects to the second subnetwork, and the routing circuitry is configured to select the second mapping by selecting a mapping that maps a subnet-prefix of the Layer-3 address to a Layer-2 address preassigned to the intermediate router in the intermediate subnetwork.

In an embodiment, the first subnetwork and the second subnetwork reside in different sites, and the routing circuitry is configured to select a third mapping by selecting a mapping that maps a site identifier of the Layer-3 address to a Layer-2 address preassigned to the intermediate router in the intermediate subnetwork. In another embodiment, the routing circuitry is configured to receive another packet to be delivered to the first subnetwork, and to forward the another packet to a Layer-2 address in the first subnetwork, carried in the another packet. In yet another embodiment, the router includes an L3-forwarding circuit including a routing table that provides access to the two or more mappings, and the L3-forwarding circuit is configured to select the mapping by accessing the routing table using selected bits of the Layer-3 address.

In some embodiments, the router further includes: (i) multiple switch interfaces respectively connected to multiple subnetworks, and (ii) a routing table that stores identifiers of the multiple switch interfaces, and the routing circuitry is configured to receive a given packet from a given subnetwork via a given switch interface, to select another switch interface connected to another subnetwork by accessing the routing table using selected bits of the Layer-3 address, and to forward the given packet to the another subnetwork via the another switch interface. In other embodiments, the router is assigned to serve as a spine in a group of a Dragonfly Plus (DF+) topology, the group comprising interconnected spines and leaves, and the routing circuitry is configured to mediate between a subnet including a host coupled to a leaf of the group and other groups of the DF+ topology by connecting to a router serving as a spine in another group of the DF+ topology. In yet other embodiments, the router is assigned to serve as a leaf in a group of a DF+ topology, the group including interconnected spines and leaves, and the routing circuitry is configured to mediate between a subnet including a host coupled to the router, and a subnet including spines of the group and of other groups of the DF+ topology.

In an embodiment, the mapping includes an algorithmic address-mapping function, and the routing circuitry is configured to apply the selected mapping by applying to the packet the algorithmic address-mapping function. In another embodiment, the router connects to the second subnetwork via a hierarchy of subnetworks having two or more levels, and the router is configured to determine the Layer-2 address of the next-hop router by applying the second mapping to a subnet-prefix field in the packet, the subnet-prefix contains partial subgroups of bits that are used by other routers downstream the hierarchy for determining Layer-2 addresses using the second mapping. In yet another embodiment, the router is coupled to multiple other routers in a Cartesian topology, and network nodes coupled to the router and to the other routers include respective subnetworks.

There is additionally provided, in accordance with an embodiment that is described herein, a method for routing, including, in a router that includes a plurality of ports, receiving from a first subnetwork, via one of the ports, a packet destined to be delivered to a target node located in a second subnetwork. A mapping is selected from among two or more mappings, depending on a topological relation between the first subnetwork and the second subnetwork. A Layer-3 address of the packet is mapped into a Layer-2 address using the selected mapping. The packet is forwarded via another one of the ports to the Layer-2 address.

There is additionally provided, in accordance with another embodiment that is described herein, a management apparatus including an interface and one or more processors. The interface is configured to connect to a first subnetwork that is coupled via a router to a second subnetwork. The one or more processors are configured to receive, via the interface, information indicative of subnetworks and of target nodes that are accessible via the router, and using the information, to assign a Layer-2 address to a port via which the router connects to the first subnetwork, the Layer-2 addresses is derivable by applying a mapping to a Layer-3 address of a given target node accessible via the router.

There is additionally provided, in accordance with yet another embodiment that is described herein, a method, including, in an apparatus connected to a first subnetwork that is coupled via a router to a second subnetwork, receiving by one or more processors, information indicative of subnetworks and of target nodes that are accessible via the router. Using the information, a Layer-2 address is assigned, by the one or more processors, to a port via which the router connects to the first subnetwork, the Layer-2 addresses is derivable by applying a mapping to a Layer-3 address of a given target node accessible via the router.

These and other embodiments will be more fully understood from the following detailed description of the embodiments thereof, taken together with the drawings in which:

DETAILED DESCRIPTION OF EMBODIMENTS

Overview

Figure 1:
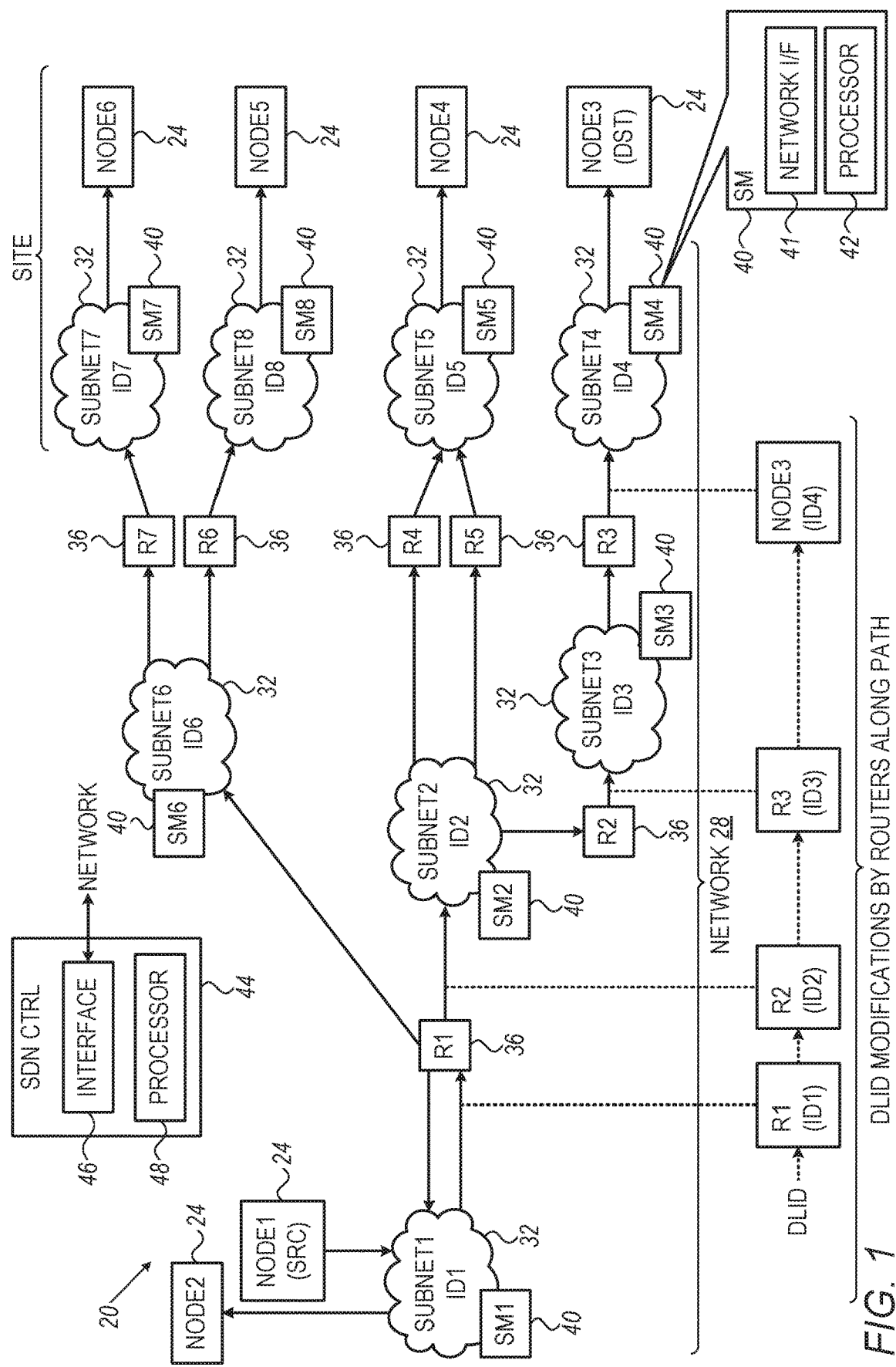
FIG. 1 is a block diagram that schematically illustrates a computing system in which routers forward packets using address mapping, in accordance with an embodiment that is described herein.

Embodiments that are described herein provide improved methods and system for packet routing and forwarding across multiple subnetworks, using address mapping.

Various applications such as datacenters, supercomputers and High-Performance Computing (HPC) applications use large-scale Layer-3 networks divided into multiple smaller subnetworks, e.g., for scaling and isolation purposes. The subnetworks are also referred to simply as "subnets" for brevity. Network ports of nodes within a given subnet share the same Layer-3 network address prefix. For example, in Internet Protocol (IP) networks, the ports in each subnet share the same most-significant bit-group in their IP address, so that the IP address is logically divided into two fields: a network or routing prefix, and the rest field or host identifier. Similarly, in InfiniBand™ (IB) networks, each subnet is uniquely identified with a subnet identifier known as the Subnet Prefix. For each port in the subnet, this prefix is combined with at least a respective Globally-Unique Identifier (GUID) to give the IB Layer-3 address of the port, known as the Global Identifier (GID).

Typically, the logical subdivision of a Layer-3 network into subnets reflects the underlying physical division of the network into Layer-2 local area networks. Such a division may be required, for example, for isolating portions of the entire fabric. Dividing a network into multiple subnets may also be required for scalability reasons, so that each subnet manager manages a relatively small portion of the entire network. Moreover, in some cases, limitations on the L2 address space may impose restrictions on the subnet size.

Routers forward packets among subnets on the basis of their Layer-3 (IP or GID) destination addresses, while within a given subnet packets are forwarded among ports by Layer-2 switches or bridges. These Layer-2 devices operate in accordance with the applicable Layer-2 protocol and forward packets within the subnet according to the Layer-2 destination address, such as the Ethernet™ medium access control (MAC) address or the IB link-layer Local Identifier (LID). In general, Layer-2 addresses in each subnet are recognized only within that subnet, and routers will swap the Layer-2 address information of packets that they forward from one subnet to another.

In a network divided into subnets, packets may traverse multiple routers and subnets along a path from a source node to a destination node. A path from one router to the next, or from a last router to the target node is referred to herein as a "hop." A path that includes multiple routers is referred to herein as a "multi-hop" path. The routers may comprise forwarding tables for translating the Layer-3 destination address in the packet into a Layer-2 address of the next-hop router. Such forwarding tables, however, require large storage space and silicon area, and result in a long lookup latency. A small forwarding table supporting only part of the entire forwarding information may be used, but is such cases, complex routing protocols are typically required for populating the forwarding tables.

In the disclosed embodiments, routers resolve next-hop Layer-2 addresses along a multi-hop path by applying a suitable address-mapping to Layer-3 destination addresses. As will be described below, this approach is very efficient in terms of storage space and lookup latency. An address mapping, also referred to herein simply as "mapping" may be implemented using a suitable address-mapping function such as an algorithmic address-mapping function. In the description that follows, an "algorithmic address-mapping function" is also referred to herein as an "algorithmic mapping function", an "algorithmic mapping" or just a "mapping," for brevity.

In some embodiments, a router comprises routing circuitry and a plurality of ports. The routing circuitry is configured to receive from a first subnetwork, via one of the ports, a packet destined to be delivered to a target node located in a second subnetwork, to select a mapping, from among two or more mappings, depending on a topological relation between the first subnetwork and the second subnetwork, to map a Layer-3 address of the packet into a Layer-2 address using the selected mapping, and to forward the packet via another one of the ports to the Layer-2 address.

The routing circuitry may select the mapping in various ways. In some embodiments, the routing circuitry selects a first mapping when the first subnetwork is connected directly by the router to the second subnetwork, and selects a second mapping, different from the first mapping, when at least one intermediate subnetwork separates between the first subnetwork and the second subnetwork.

In an embodiment, the routing circuitry selects the first mapping by selecting a function that extracts from the Layer-3 address a Layer-2 address preassigned to the target node in the second subnetwork. In another embodiment, the router connects via an intermediate subnetwork to an intermediate router that connects to the second subnetwork, and the routing circuitry selects the second mapping by selecting a function that algorithmically maps a subnet-prefix of the Layer-3 address to a Layer-2 address preassigned to the intermediate router in the intermediate subnetwork. In yet another embodiment, the first subnetwork and the second subnetwork reside in different sites, and the routing circuitry selects a third mapping by selecting a function that maps a site identifier of the Layer-3 address to a Layer-2 address preassigned to the intermediate router in the intermediate subnetwork. In the present context and in the claims, the term "site" refers to a network topology that comprises multiple subnetworks.

The disclosed router supports switching a packet back to the same subnetwork from which it came. In an example embodiment, the router receives another packet to be delivered to the first subnetwork, and the routing circuitry is forwards the another packet to a Layer-2 address in the first subnetwork, carried in the another packet.

In some embodiments, the router comprises an L3-forwarding circuit comprising a routing table that provides access to the two or more mappings. The L3-forwarding circuit serves for forwarding packets to subnetworks different from the subnetworks they came from. In such embodiments, the L3-forwarding circuit selects the mapping by accessing the routing table using selected bits of the Layer-3 address. The router further comprises: (i) multiple switch interfaces respectively connected to multiple subnetworks, and (ii) a routing table that stores identifiers of the multiple switch interfaces. The routing circuitry receives a given packet from a given subnetwork via a given switch interface, selects another switch interface connected to another subnetwork by accessing the routing table using selected bits of the Layer-3 address, and forwards the given packet to the another subnetwork via the another switch interface.

The disclosed router may be used in various topologies such as, for example, in a Dragonfly Plus (DF+) topology. The DF+ topology comprises multiple groups, each of which comprises multiple spines and multiple leaves. In an embodiment, the router is assigned to serve as a spine in a group of a DF+ topology, and the router mediates between (i) a subnet comprising a host coupled to a leaf of the group and (ii) other groups of the DF+ topology, by connecting to a router serving as a spine in another group of the DF+ topology. In other embodiments, the router is assigned to serve as a leaf in a group of a DF+ topology, and the router mediates between (i) a subnet comprising a host coupled to the router, and (ii) a subnet comprising spines of all of the groups.

In some embodiments, the mapping comprises an algorithmic address-mapping function, and the routing circuitry applies the selected mapping by applying to the packet the algorithmic address-mapping function.

In some embodiments, a router connects to the second subnetwork via a hierarchy of subnetworks having two or more levels. In such embodiments, the router determines the Layer-2 address of the next-hop router by applying the second mapping to a subnet-prefix field in the packet, wherein the subnet-prefix contains partial subgroups of bits that are used by other routers downstream the hierarchy for determining Layer-2 addresses using the second mapping. In the disclosed techniques a router supports determining a next-hop Layer-2 address by applying to a Layer-3 destination address of the packet a suitable mapping. The router selects the mapping depending on the topological location of the router within the underlying network. For example, different mappings are applied depending on whether the router connects directly or indirectly to a subnet containing the target node. Using the disclosed techniques, fast low-complexity routing is possible, compared to conventional routing.

System Description

FIG. 1 is a block diagram that schematically illustrates a computing system 20 in which routers forward packets using address mapping, in accordance with an embodiment that is described herein.

Computing system 20 comprises multiple network nodes 24, denoted NODE1 . . . NODE6, communicating with one another over a packet network 28. In the description that follows, it is generally assumed that network 28 operates in accordance with the InfiniBand™ (IB) network protocols. The disclosed embodiments, however, are applicable to other suitable networks such as IP networks.

Computing system 20 may be used in various applications such as, for example, datacenters and HPC systems.

The description that follows refers mainly to algorithmic address-mapping, as an example. The disclosed embodiments are similarly applicable, however, to other suitable address-mapping methods.

Network 28 comprises multiple subnetworks 32 denoted SUBNET1 . . . SUBNET8, each of which comprising multiple switches (not shown). A subnetwork is also referred to simply as a "subnet" for brevity. Subnets 32 are identified using respective identifiers denoted ID1 . . . ID8, which are also referred to as "subnet prefixes." As will be described in detail below, packets traversing network 28 carry Layer-2 and Layer-3 addresses. The switches within subnets 32 forward packets based on Layer-2 addresses of the packets. Subnets 32 are interconnected using routers 36, denoted R1 . . . R7, which forward packets based on Layer-3 addresses of the packets. A router 36 connects to a given subnet 32 using a port that is assigned a Layer-2 address in the given subnet.

In the context of an IB network, a Layer-3 address is referred to as a Global Identifier (GID), and a Layer-2 address is referred to as a Local Identifier (LID). Source and destination Layer-3 addresses are referred to as SGID and DGID, respectively, whereas source and destination Layer-2 addresses are referred to as SLID and DLID, respectively. The DGID comprises a GID prefix field, which is common to all ports in the subnet, and a Globally Unique Identifier (GUID) field, which is unique to each port in the subnet.

In the example, of FIG. 1, network nodes NODE1 and NODE2 are end nodes of SUBNET1, which connects via router R1 to SUBNET2 and SUBNET6. SUBNET2 connects via router R2 to SUBNET3, and via routers R4 and R5 to SUBNET5 to which NODE4 belongs. SUBNET3 connects via router R3 to SUBNET4 to which NODE3 belongs. SUBNET6 in a first site connects via R6 and R7 to a second site comprising SUBNET7 and to a third site comprising SUBNET 8, wherein NODE6 belongs to SUBNET7 on the second site and NODE5 belongs to SUBNET8 on the third site. Note that each site comprises multiple subnetworks, but in FIG. 1, only SUBNET7 is depicted in the second site and only SUBNET8 is depicted in the third site, for the sake of figure clarity.

In the example of FIG. 1, NODE1 may send packets to each of nodes NODE2 . . . NODE6. For example, NODE1 may send a packet to NODE2 along a path in the network comprising one or more switches within SUBNET1. Typically, such a path will not contain R1. In another embodiment, however, in which such a path includes R1, R1 receives the packet from SUBNET1 and returns it to the same subnet SUBNET1. A packet sent from NODE1 to NODE3 over network 28, contains the Layer-3 address of NODE3 and a Layer-2 address of R1 in SUBNET1 (ID1). In some embodiments, in order to forward the packet from R1 to R2, R1 modifies the Layer-2 address of the packet to the Layer-2 address of R2 in SUBNET2 (ID2) and transmits the packet via a port of R1 that connects to SUBNET2. Similarly, to reach R3, R2 modifies the Layer-2 address of the packet to the Layer-2 address of R3 in SUBNET3 and transmits the packet via a port of R2 that connects to SUBNET3. To reach NODE3, R3 modifies the Layer-2 address of the packet to the Layer-2 address of NODE3 in SUBNET4 and transmits the packet via a port of R3 that connects to SUBNET4. The chain of Layer-2 address modifications by R1, R2 and R3 is depicted at the lower part of FIG. 1.

Note that SUBNET2, SUBNET3 and SUBNET4 form a hierarchy of subnets, wherein SUBNET2 is an outer subnet, SUBNET3 is inner to SUBNET2 and SUBNET 4 is inner to SUBNET3. A method for determining DLIDs in a hierarchy of subnets will be described in detail below, with reference to FIG. 2.

In sending a packet from NODE1 to NODE4, R1 modifies the Layer-2 address to that of R4 (or R5) in SUBNET2, and R4 (or R5) further modifies the Layer-2 address to that of NODE4 in SUBNET5. In sending a packet from NODE1 to NODE5, R1 modifies the Layer-2 address of the packet to that of R6 in SUBNET6 based on a site identifier in the packet, and R6 modifies the Layer-2 address of the packet to that of NODE5 in SUBNET8. In sending a packet from NODE1 to NODE6, R1 modifies the Layer-2 address of the packet to that of R7 in SUBNET6 based on the site identifier in the packet, and R7 modifies the Layer-2 address of the packet to that of NODE6 in SUBNET7. In the example of FIG. 1, a group of routers containing R6 and R7 is selected based on site identifier.

As will be described in detail below, in the disclosed embodiments, routers determine egress Layer-2 address for a packet to be forwarded, by applying an algorithmic address-mapping function to the Layer-3 address of the target, carried in the packet.

A Subnet Manager (SM) 40 in each subnet 32 performs management and administration functions defined by the above-mentioned IB specification. SM 40 comprises an interface 41 and a processor 42. SM 40 communicates using interface 41 with elements of the network such as routers 36 and switches of the subnets. Processor 42 performs various management tasks of SM 40 as will be described below. In some embodiments, SM 40 in each subnet assigns a Layer-2 address, in the form of a LID, to each physical port of each network node 24 within the given subnet. A subnet administration (SA) function provides nodes with information gathered by the SM, including communication of the LID information to a Subnet Management Agent (SMA) in each network node of the subnet. SM 40 configures switches (e.g., configures forwarding table in the switch) within each subnet 32 to forward packets among the ports on the basis of the destination Layer-2 (DLID) in the packet header. SM 40 sends to the routers, configuration information specifying, for example, which subnets are connected via each router. Using this configuration information, the routers are configured to perform Layer-2 forwarding to the same subnetwork or Layer-3 forwarding to a different subnetwork as will be described in detail below.

In addition to a Layer-2 address, each port in a subnet 32 also receives a Layer-3 address (e.g., GID) (which may also be assigned by SM 40), wherein all ports in a given subnet have the same GID prefix, but each port in the subnet has a different GUID. In some embodiments, each SM 40 assigns the LIDs in its subnet so that they correspond algorithmically to the respective GIDS, as will be explained in greater detail hereinbelow.

In some embodiments, network 28 comprises a Software Defined Network (SDN) controller 44, which comprises an interface 46 and a processor 48. The SDN controller receives via interface 46 information related to the topology of network 28. For example, the information may be indicative of subnets that are accessible via the various routers, of subnets belonging to a common site, and so on. Processor 48 assigns Layer-2 addresses to ports of routers based on the information so that routing using algorithmic address-mapping functions by routers 36 works properly. Methods for assigning addresses in network 28 will be described in more detail further below.

In some embodiments, SDN controller 44 collaborates with one or more SMs 40 for performing address assignments. In such embodiments, the SDN controller and SMs may be viewed collectively as a management apparatus. Thus, SMs 40 may communicate with one another directly or via a central entity that synchronizes among the SMs.

Subnet IDs may be assigned, for example, by an Information Technology (IT) manager, according to various requirements such as address uniqueness.

Packet Header Fields Used in Address Mapping

Figure 2:
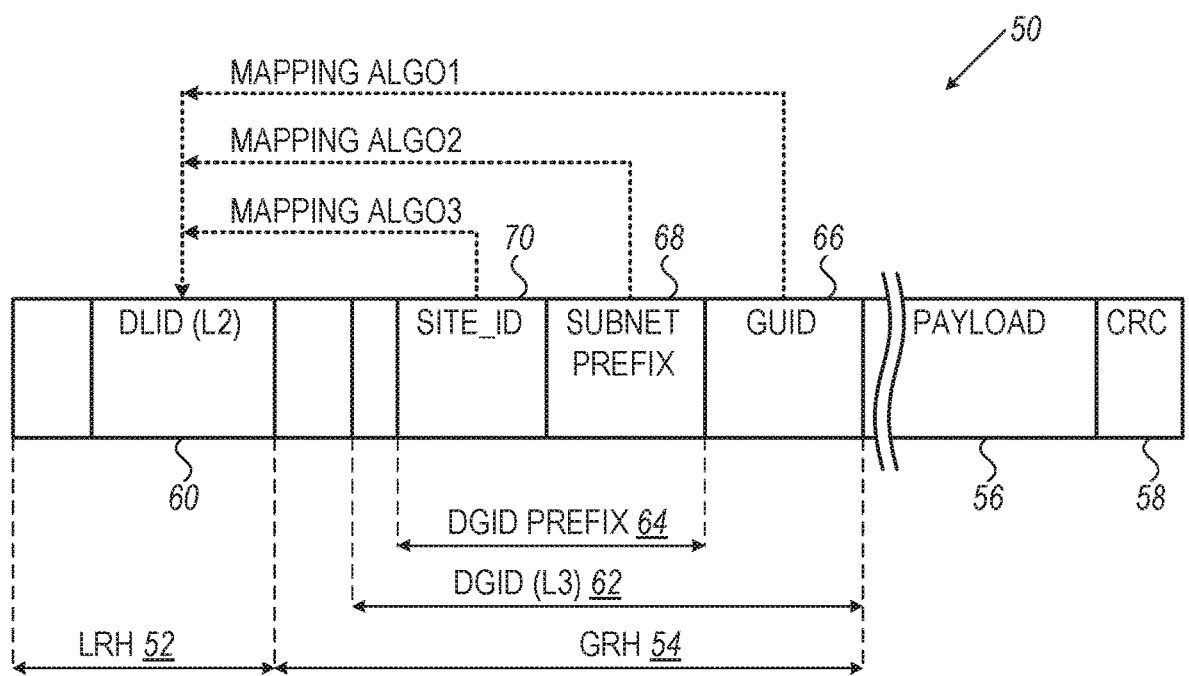
FIG. 2 is a diagram that schematically illustrates a data packet with header fields used in address mapping, in accordance with an embodiment that is described herein.

FIG. 2 is a diagram that schematically illustrates a data packet 50, with header fields used in address mapping, in accordance with an embodiment that is described herein.

The packet layout is simplified, and the description of the packet headers is limited to the fields that are directly relevant to the present embodiments. The terminology used in describing packet 50 is taken from the IB context, but other packet network standards, such as IP standards, use similar sorts of packet structures.

Packet 50 comprises a Layer-2 header 52, referred to as a Local Routing Header (LRH), followed by a Layer-3 header 54, referred to as a Global Routing Header (GRH), followed by transport headers (not shown), a payload 56, and an error detection field 58, which typically contains a Cyclic Redundancy Code (CRC). The Layer-2 destination address, or DLID, is contained in a DLID field 60 in LRH header 52, while the Layer-3 destination address, or DGID, is contained in a DGID field 62 in GRH header 54. For unicast packets, such as the packet shown in FIG. 2, the DGID comprises a GID prefix 64, and a respective Globally-Unique Identifier (GUID) 66. The GID prefix further contains a subnet prefix 68 which is common to all ports in a given subnet 32, and a site identifier 70 (denoted SITE_ID).

As illustrated by the dashed arrows in FIG. 2, SM 40 assigns a unicast LID to each port in subnet 32 by applying a selected address-mapping to a corresponding field in the Layer-3 address DGID 62. In the present example, three types of mappings denoted ALGO1, ALGO2 and ALGO 3 may be applied to derive DLID 60: ALGO1 is based on GUID 66, ALGO2 is based on subnet prefix 68 and ALGO3 is based on site identifier 70. (Equivalently, in other types of networks, Layer-3 addresses are mapped to unicast MAC addresses.)

In IB networks, the DLID is sixteen bits long as well as the subnet prefix 68 and site identifier 70. Therefore, in some embodiments, ALGO2 and ALGO3 may comprise copying the corresponding subnet prefix or site identifier to the DLID field. In alternative embodiments, other ALGO2 and ALGO3 mapping methods can be used, e.g., adding to the subnet prefix, to the site identifier, or to both, a predefined integer.

In some embodiments, the network topology comprises a hierarchy of subnets. For example, in a two-level hierarchy of subnets, a first (e.g., outer) subnet contains one or more second intermediate (e.g., inner) subnets, wherein the first subnet is higher in the hierarchy relative to the second subnets. In a topology that comprises hierarchical subnetworks, the ALGO2 mapping may be applied to the packet multiple times along the path from the source node to the destination node. In one embodiment, the ALGO2 mapping generates different respective DLIDs for different levels of the hierarchy even though in all of the levels ALGO2 is based on the same subnet prefix field (68) in the packet. In another embodiment, the ALGO2 mapping generate the same DLID to multiple routers in the hierarchy, and each intermediate subnetwork properly forwards the packets to the next hop router based on that DLID.

In some embodiments, in different levels of the hierarchy ALGO2 is applied to different group of bits in the subnet prefix field. For example, a subnet prefix number 4, or binary 100, contains subnet prefix numbers 0, 1, 2 and 3 (binary 00, 01, and 11) of subnets lower in the hierarchy. In this example, ALGO2 for reaching the inner subnetworks is based on the two LSBs of the subnet prefix.

In an embodiment, a router connects to the subnetwork to which the target node connects, via a hierarchy of subnetworks having two or more levels. The router determines the Layer-2 address of the next-hop router by applying the second mapping to a subnet-prefix field in the packet. The subnet-prefix contains partial subgroups of bits that are used by other routers downstream the hierarchy for determining Layer-2 addresses using the second mapping.

In IB networks, the GUID is sixty-four bits long, while the DLID is only sixteen bits, and for the ALGO1 function any suitable combination of the bits in GUID 66 may be used to derive DLID 60. Probably the simplest solution (and an effective solution) is to set the DLID equal to the sixteen least significant bits (LSB) of the GUID. Optionally, to avoid situations in which two different GUIDs in a given subnet have the same sixteen LSB, and thus map to the same DLID, SM 40 may assign alias GUIDs that map uniquely to the respective DLIDs, and may then publish the resulting alias GUID values to a Domain Name System (DNS) (not shown). (The alias GUID implicitly defines an alias GID that contains the alias GUID.) For example, SM 40 may assign each alias GUID to be the corresponding sixteen-bit LID preceded by forty-eight zeros. Alternatively, other ALGO1 algorithmic mapping functions may be applied in mapping the GUID of each port in a subnet to the DLID.

The term "algorithmic address-mapping function" (and each of the corresponding short-form terms mentioned above) is used herein to mean that the mapping function can be computed mathematically by an appropriate computing entity (such as, for example, Layer-3 forwarding logic in routers 36) without resort to a lookup table. Any suitable function can be used for this purpose, including arithmetic, algebraic, and Boolean functions, as long as it is chosen so as to create a one-to-one mapping between DGIDs and DLIDs in the subnet. In alternative embodiments, other suitable types of address mappings can also be used.

As will be described below, the router selects a mapping, from among ALGO1, ALGO2 and ALGO3, depending on a topological relation between the subnet from which the router receives a packet and a subnet to which the target node belongs. The topological relation refers to the location of the target in the network relative to the router in question.

Router Block Diagram

Figure 3:
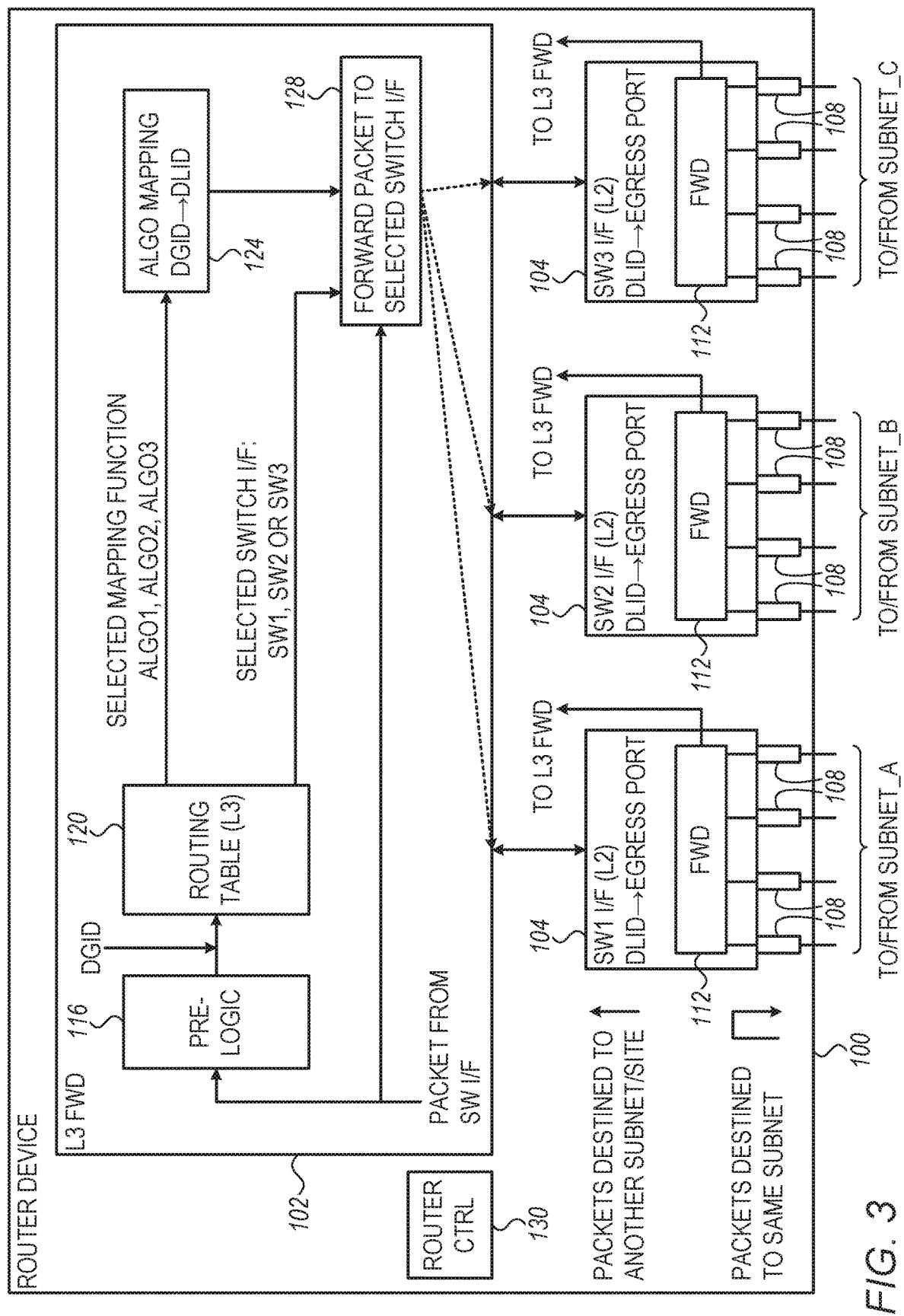
FIG. 3 is a block diagram that schematically illustrates a router using algorithmic address mapping, in accordance with an embodiment that is described herein.

FIG. 3 is a block diagram that schematically illustrates a router 100 using algorithmic address mapping, in accordance with an embodiment that is described herein.

Router 100 may be used, for example, in implementing routers 36 of FIG. 1 above.

Router 100 comprises a Layer-3 forwarding module 102, and multiple switch interfaces 104, each of which comprising multiple ports 108 for connecting to a communication network such as network 28 of FIG. 1. Ports 108 are configured to operate both as ingress ports that receive packets from the network and as egress ports that transmit packets to the network. Switch interfaces 104 connect via ports 108 to different respective subnets 32. In the present example router 100 comprises three switch interfaces 104 denoted SW1, SW2, SW3, coupled to respective subnets denoted SUBET_A, SUBNET_B and SUBNET_C.

Switch interfaces 104 are configured to forward incoming packets based on the Layer-2 address (e.g., DLID 60 of FIG. 2) carried in the packet. Switch interface 104 forwards incoming packets using a forwarding table 112. When an incoming packet is destined to be delivered back the same subnet from which it came, forwarding table 112 selects, based on the DLID of the packet, an egress port 108 via which to transmit the packet. When the packet is destined to be delivered to a subnet different from the subnet from which it came, the switch interface forwards the packet to Layer-3 forwarding module 102, which performs Layer-3 forwarding based on the Layer-3 destination address (e.g., DGID 62 of FIG. 2) of the packet.

Pre-logic 116 extracts the DGID field from GRH 54 of the packet and provides it to a routing table 120. Routing table 120 is preconfigured to select an algorithmic mapping function from among ALGO1, ALGO2 and ALGO3, and to select a switch interface among SW1, SW2 and SW3. The selection of the algorithmic mapping function and the switch interface is generally based on the topological location of the router and the target node within network 28. The term "topological relation" refers to herein as a connectivity relationship between a subnet sending packets directly to the router and the subnet to which the target node belongs.

Aspects of topological relation include, for example, whether the router connects directly or indirectly to the subnet to which the target node belongs, or whether the packet is to be delivered to a target node in another site.

In some embodiments, routing table 120 comprises an associative table that receives the DGID of a packet as a key and outputs (i) an algorithmic mapping function ALGO1, ALGO2 or ALGO3, and (ii) a switch interface among SW1, SW2 and SW3. Routing table 120 comprises three entries, which requires significantly less storage space than a full forwarding table as conventionally used for Layer-3 forwarding to a next-hop router.

A mapping module 124 determines the DLID of the egressed packet by applying the selected mapping function to the DGID of the packet. A forwarding module 128 forwards the received packet to the selected switch interface, which looks-up a port 108 for the packet using forwarding table 112 and transmits the packet via the selected port.

Router 100 sets the DLID field in the packet header to the DLID determined using mapping module 124. Moreover, the router sets the LID assigned to output port selected for the packet in the packet's SLID field.

Router 100 comprises a router controller 130 that manages various control plane tasks of the router. Router controller 130 communicates with SMs 40 of SUBNET_A, SUBNET_B and SUBNET_C, with SDN controller 44, or both, for the purpose of assigning Layer-3 and Layer-2 addresses.

In the example of FIG. 3, router device 100 comprises both a L2 switching layer and a L3 routing layer. This configuration, however, is not mandatory, and other types of routers devices can also be used. For example, an embodiment in which a router comprising a router interface instead of a switching layer can also be used. In such an embodiment, incoming packets are forwarded using router functionality. This may be applicable, for example, in ethernet based networks.

Methods for Routing Using Algorithmic Address Mapping

Figure 4:
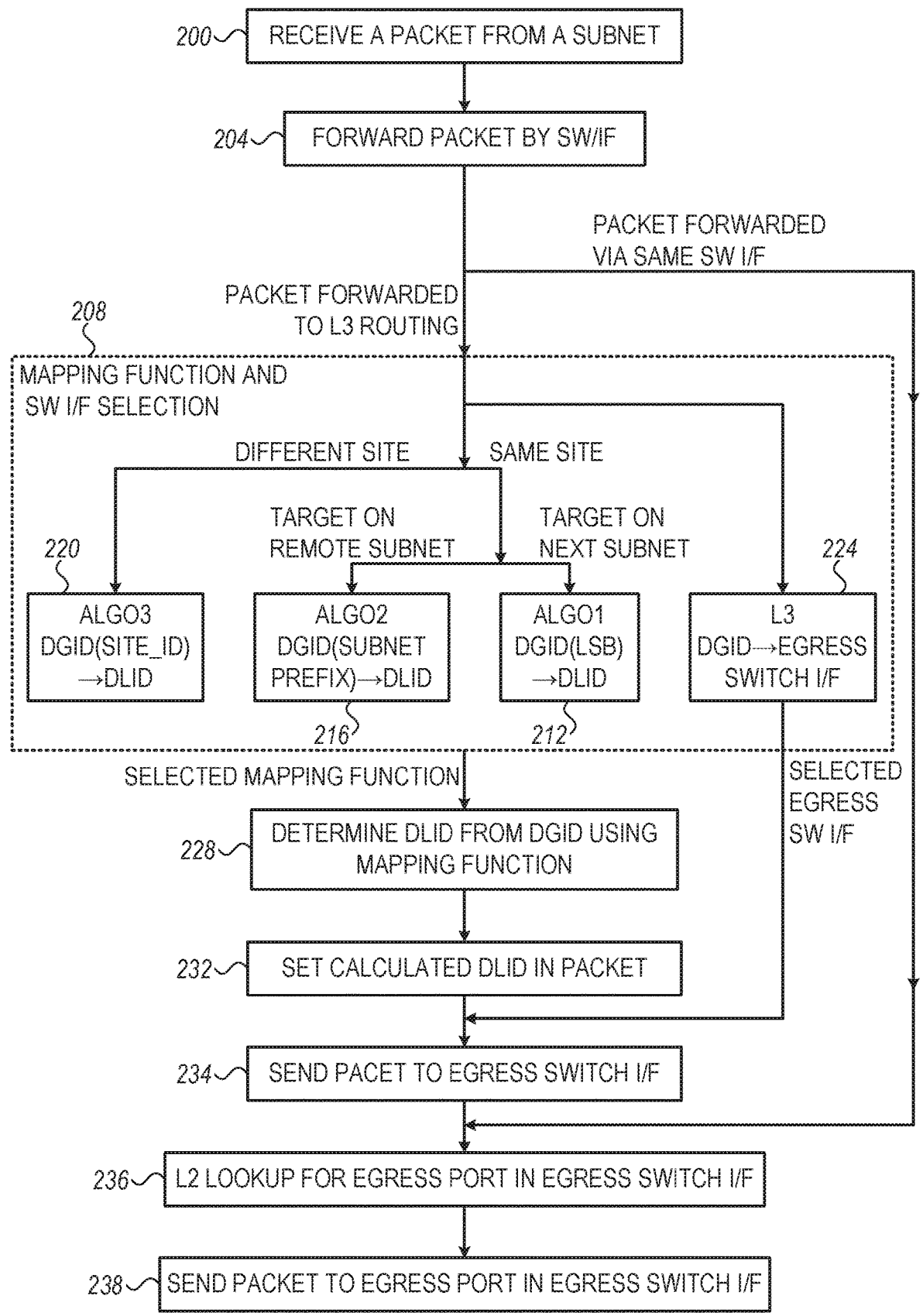
FIG. 4 is a flow chart that schematically illustrates a method for routing using algorithmic address mapping, in accordance with an embodiment that is described herein.

FIG. 4 is a flow chart that schematically illustrates a method for routing using algorithmic address mapping, in accordance with an embodiment that is described herein.

The method will be described as executed by router 100 of FIG. 3. The method, however, is similarly applicable to other types or router devices as described above. In performing the method, it is assumed that the site containing the subnet to which the target node belongs is identified using a site identifier (e.g., SITE_ID 70 of FIG. 2), and that the subnet to which the target belongs is identified using a subnet prefix (e.g., subnet prefix 68 of FIG. 2.

The method begins at a reception step 200, with router 100 receiving a packet from a subnet to which the router connects. The router receives the packet via a port 108 of a switch interface 104. At a switch interface forwarding step 204, the switch interface in question forwards the packet using forwarding table 112.

When the received packet is destined to be delivered to another subnet, the method proceeds to a selection step 208, which includes multiple logical steps as will be described herein. The router may detect that the packet is destined to the same or to another subnet based on the DLID in the packet, or by configuring a given port to forward packets to L3 routing independently from the DLID. In some embodiments, the logical steps of step 208 are implemented implicitly within routing table 120 of the router. In alternative embodiments, the logical steps of step 208 may be implemented explicitly using suitable hardware and/or software elements.

At step 208, the method splits into several branches so as to select a mapping function and an egress switch interface. In the present example, router 100 first checks whether the packet is to be forwarded within the same site or to a different site. When forwarding within the same site, the router checks whether the target node resides in a subnet connecting directly to the router or in a remote subnet that connects to the router via one or more other routers.

When the target node belongs to a subnet that connects directly to the router (in the same site), the router selects, at a first selection step 212, the ALGO1 function, which in the present example, maps the 16 LSB of the DGID to a DLID. When the target node belongs to a subnet that connects indirectly to the router in the same site, the router selects, at a second selection step 216, the ALGO2 function, which maps the subnet prefix to the DLID. When the target node belongs to a subnet in a different site, the router selects, at a third selection step 220, the ALGO3 function, which maps the destination site identifier to the DLID.

At an egress switch interface selection step 224, the router selects an egress switch interface for the packet, based on the subnet prefix field (68) in the DGID (64). In some embodiments, the router executes step 224 in parallel to a relevant step 212, 216 or 220. At a DLID determination step 228, the router determines the DLID by applying the selected algorithmic mapping function to the DGID, and at a DLID modification step 232, the router sets the DLID field in the packet to the DLID value calculated at step 228.

After executing both steps 224 and 232, the router sends the packet to the relevant switch interface at an egress switch forwarding step 234. The switch interface that receives the packet performs a Layer-2 lookup using forwarding table 112 to determine an egress port 108 for the packet, at an egress port selection step 236. At a transmission step 238, the router transmits the packet via the selected port to the relevant subnet. Following step 238, the method terminates.

When at step 204 above, the received packet is destined to be delivered to a target node within the same subnet, there is no need to send the packet to Layer-3 forwarding module 102. Instead, the router proceeds directly to step 236 to lookup an egress port for the packet. In this case the DLID of the received packet remains unmodified. In some embodiments, the DLID carried in the packet is set to the same DLID value assigned to the router. In such embodiments, the router forwards the packet to the same subnet it came from.

Example Network Topologies Used in Computing Systems

Figure 5:
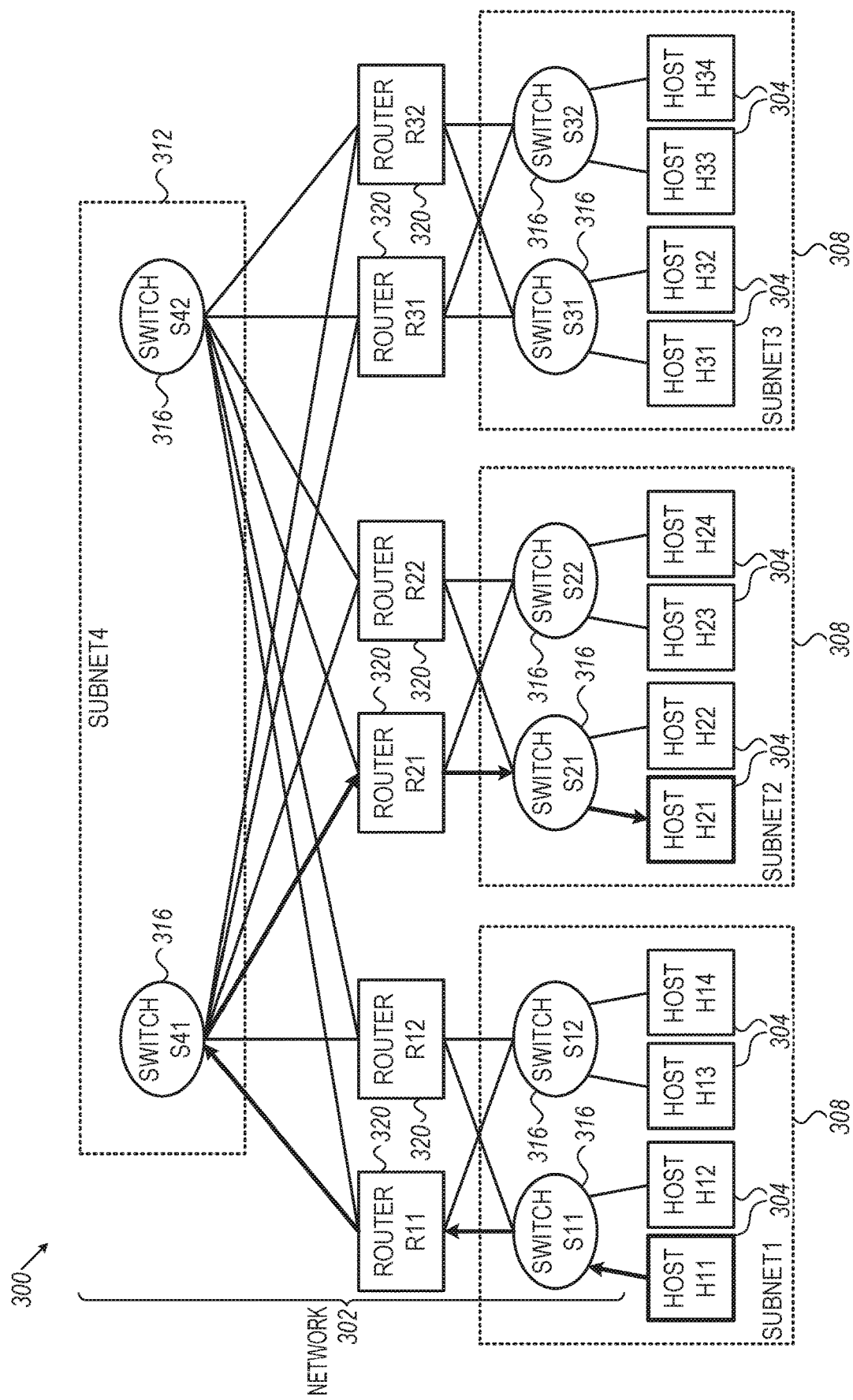
FIG. 5 is a block diagram that schematically illustrates a computing system in which multiple subnets connect to a common subnet, in accordance with an embodiment that is described herein.

FIG. 5 is a block diagram that schematically illustrates a computing system 300 in which multiple subnets connect to a common subnet, in accordance with an embodiment that is described herein.

Computing system 300 comprises a network 302. In the present example, hosts 304 in network 302 are coupled to subnets 308 denoted SUBNET1, SUBNET2 and SUBNET3, whereas a subnet 312 (denoted SUBNET4) serves as an intermediate subnet. Each of subnets 308 comprises multiple switches 316 to which hosts 304 connect. Switches 316 forward packets based on Layer-2 addresses. In FIG. 5, only two switches are depicted per subnet 408, for the sake of clarity. In practice, each subnet 308 may comprise hundreds or even thousands of switches.

Network 302 comprises routers 320 that connect to common subnet 312 and to subnets 308. Subnet 312 comprises two switches, each of which connects to each of routers 320. In other embodiments, subnet 312 may comprise a single switch or any other suitable number of switches greater than two. In the present example, each subnet 308 is accessible from subnet 312 using multiple routers (two in the example FIG. 5). In a more general configuration, network 302 may comprise multiple subnets such as subnet 312, wherein each of these subnets 312 allows access to different respective groups of subnets 308.

Sending a packet from a source node to a target node within the same subnet 308 is carried out based on the Layer-2 destination address (e.g., DLID) of the packet. As described above, a router 320 may receive a packet from a subnet 308 and send it back to the same subnet. Sending a packet from a source node in one subnet 308 to a target node in another subnet is supported via the switches of SUBNET4 (denoted S41 and S42).

In some embodiments, a group of routers coupled to a common subnet are assigned a floating LID. For example, each pair of R11 and R12, R21 and R22, and R31 and R32, may be assigned a respective floating LID in a respective subnet 308 and a respective floating LID in subnet 312.

Next is described a process of a packet transmission from node H11 in SUBNET1 to host H21 in SUBNET2. The process starts with H11 sending a packet in which the Layer-2 destination address is the Layer-2 address of R11, R12 or both (in case of a floating LID), in SUBNET1, and the Layer-3 destination address is the Layer-3 address of H21. Router R11 receives the packet and identifies that it is destined to a different subnet—SUBNET2. R11 applies algorithmic address mapping to the Layer-3 destination address using the ALGO2 algorithmic mapping function to determine the Layer-2 address of router R21, R22 or both, in SUBNET4. R11 then forwards the packet via switch S41 or S42 to router R21. Since R21 connects directly to SUBNET2 to which H21 belongs, R21 determines the next Layer-2 address by applying ALGO1 to the Layer-3 destination address. R21 then forwards the packet toward H21 via the switches of SUBNET2.

Note that even though the Layer-2 address may be common to multiple routers in a group (e.g., a floating LID) the packet will be forwarded to the correct router in the group of routers using forwarding tables or using advanced methods such as adaptive routing.

Table 1 depicts the (IB) Layer-2 and Layer-3 source and destination addresses along the route from H11 to H21 described above.

TABLE 1

L2 and L3 addresses along route from H11 to H21

|  | SLID | DLID | SGID | DGID |
| --- | --- | --- | --- | --- |
| H11 -> R11 | SLID (H11) | DLID (R11), DLID (R12) or both, in SUBNET1 | SGID (H11) | DGID (H21) |
| R11 -> R21 | SLID (R11) in SUBNET4 | DLID (R21), DLID (R22) or both, in SUBNET4 | SGID (H11) | DGID (H21) |
| R21 -> H21 | SLID (R21) in SUBNET2 | DLID (H21) in SUBNET2 | SGID (H11) | DGID (H21) |

Note that in Table 1, the term "both" in the phrase "DLID(R11), DLID(R12) or both, in SUBNET1" refers to a floating LID assigned to both R11 and R12 in a group of routers. The term "both" similarly applies to a group of routers comprising R21 and R22, and to other groups of routers as will be described below.

Figure 6:
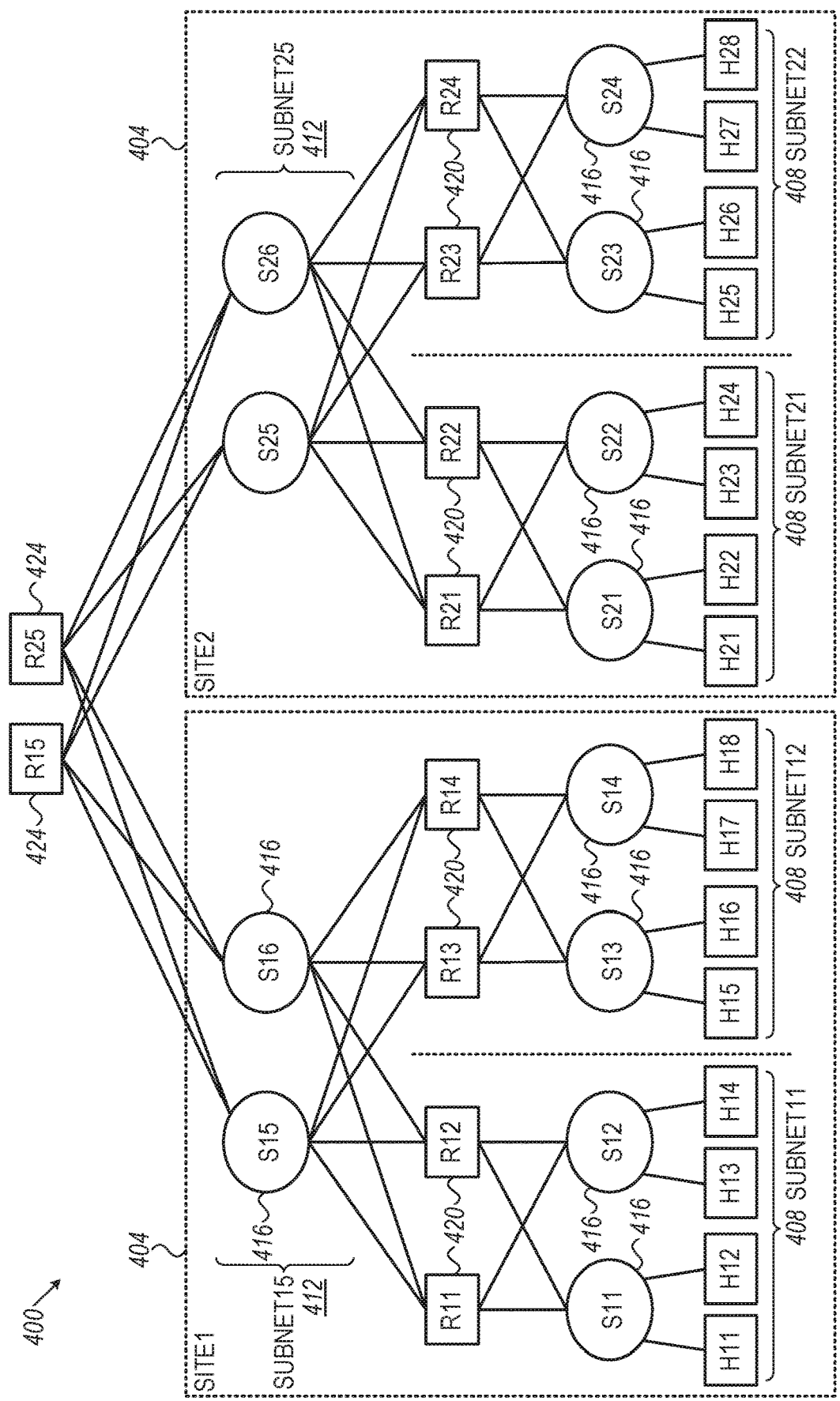
FIG. 6 is a block diagram that schematically illustrates a computing system in which a network comprises multiple sites, in accordance with an embodiment that is described herein.

FIG. 6 is a block diagram that schematically illustrates a computing system 400 in which a network comprises multiple sites, in accordance with an embodiment that is described herein.

In the example embodiment of computing system 400, the network comprises two sites 404 denoted SITE1 and SITE2, wherein each site comprises two subnets 408 interconnected using a subnet 412. Subnets 408 of SITE1 are denoted SUBNET11 and SUBNET12, and subnets 408 of SITE2 are denoted SUBNET21 and SUBNET22. The structure of subnets 408 is similar to that of subnets 308 of FIG. 5 above, with two subnets 408 rather than three subnets 308.

In the present example, hosts denoted H11 . . . H18 are coupled to subnets 408 in SITE1, and hosts denoted H21 . . . H28 are coupled to subnets 408 in SITE2. Each of subnets 412 serves as an intermediate subnet in a respective site. Each of subnets 408 comprises multiple switches 416 to which the hosts connect. In FIG. 6, only two switches are depicted per subnet 408, for the sake of clarity. In practice, each subnet 408 may comprise hundreds or even thousands of switches.

Routers 420 mediate between subnets 412 and subnets 408. Each subnet 412 comprises two switches, denoted S15 and S16 in SITE1 and S25 and S26 in SITE2. Each of these switches connects to each of routers 420 in the same site. In other embodiments, subnet 412 may comprise a single switch or any other suitable number of switches greater than two. In the present example, each subnet 408 is accessible from a subnet 412 via multiple routers (two in FIG. 6).

Routers 424 denoted R15 and R25 interconnect between SITE1 and SITE2. In the present example each of R15 and R16 connects to each of switches S15, S16, S25 and S26.

Sending a packet from a source node to a target node in the same subnet or different subnet within the same site may be carried out using the ALGO1 and ALGO2 mapping functions as described above with reference to FIG. 5. Sending a packet across different sites, however, requires the application of the algorithmic function ALGO3, as described herein.

Next is described a process of packet transmission from node H11 in SUBNET11 of SITE1 to host H21 in SUBNET21 of SITE2. The process starts with H11 sending a packet in which the Layer-2 destination address is the Layer-2 address of R11, R12, or both, in SUBNET11, and the Layer-3 destination address is the Layer-3 address of H21. R11 receives the packet and identifies that it destined to a different site. R11 thus applies algorithmic address mapping to the Layer-3 destination address using the ALGO3 mapping function to determine the Layer-2 address of router R15, R25 or both, in SUBNET15 of SITE1. R11 then forwards the packet via switch S15 of SUBNET15 to router R15. Using ALGO2, R15 maps the Layer-3 destination address to the Layer-2 address of R21, R22 or both, in SUBNET25 and forwards the packet to S25. Since R21 connects directly to SUBNET21 to which H21 belongs, R21 determines the Layer-2 address by applying ALGO1 to the Layer-3 destination address of H21. R21 then forwards the packet toward H21 via the switches of SUBNET21.

Figure 7:
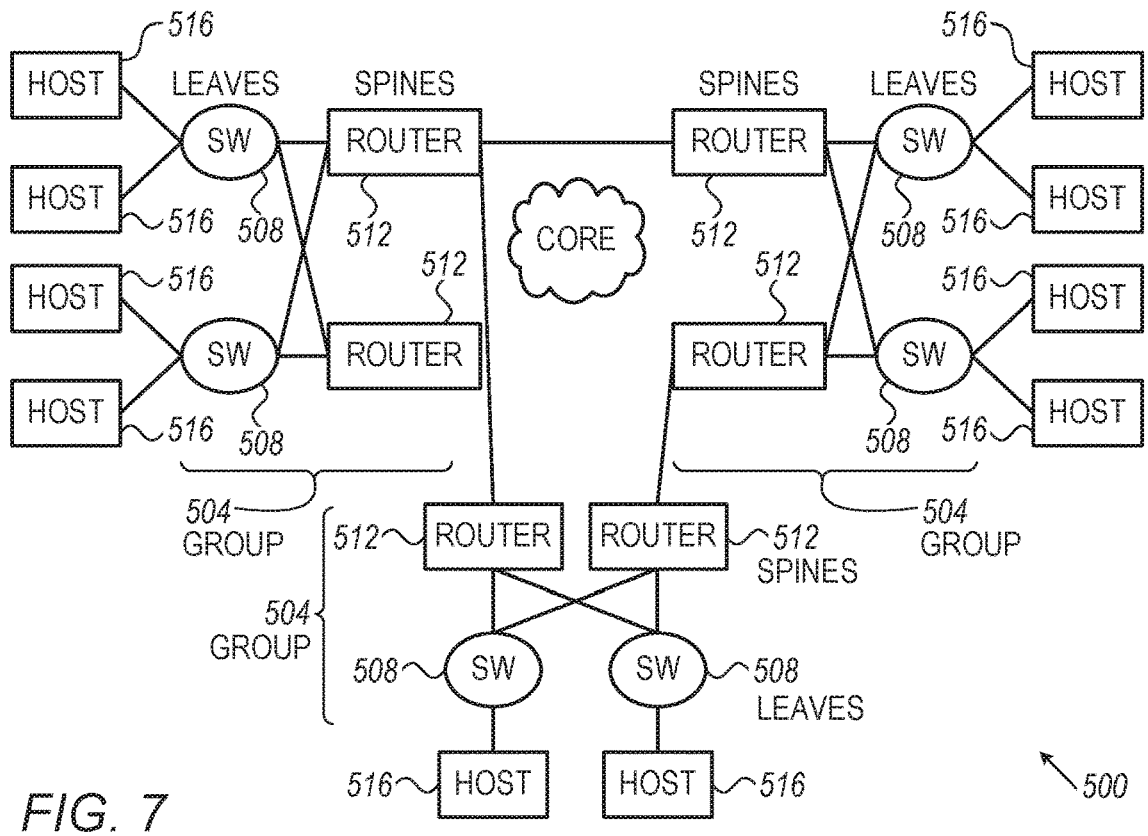
FIGS. 7 and 8 are block diagrams that schematically illustrate computing systems in which a network has a Dragonfly Plus (DF+) topology, in accordance with an embodiment that is described herein.
Figure 8:
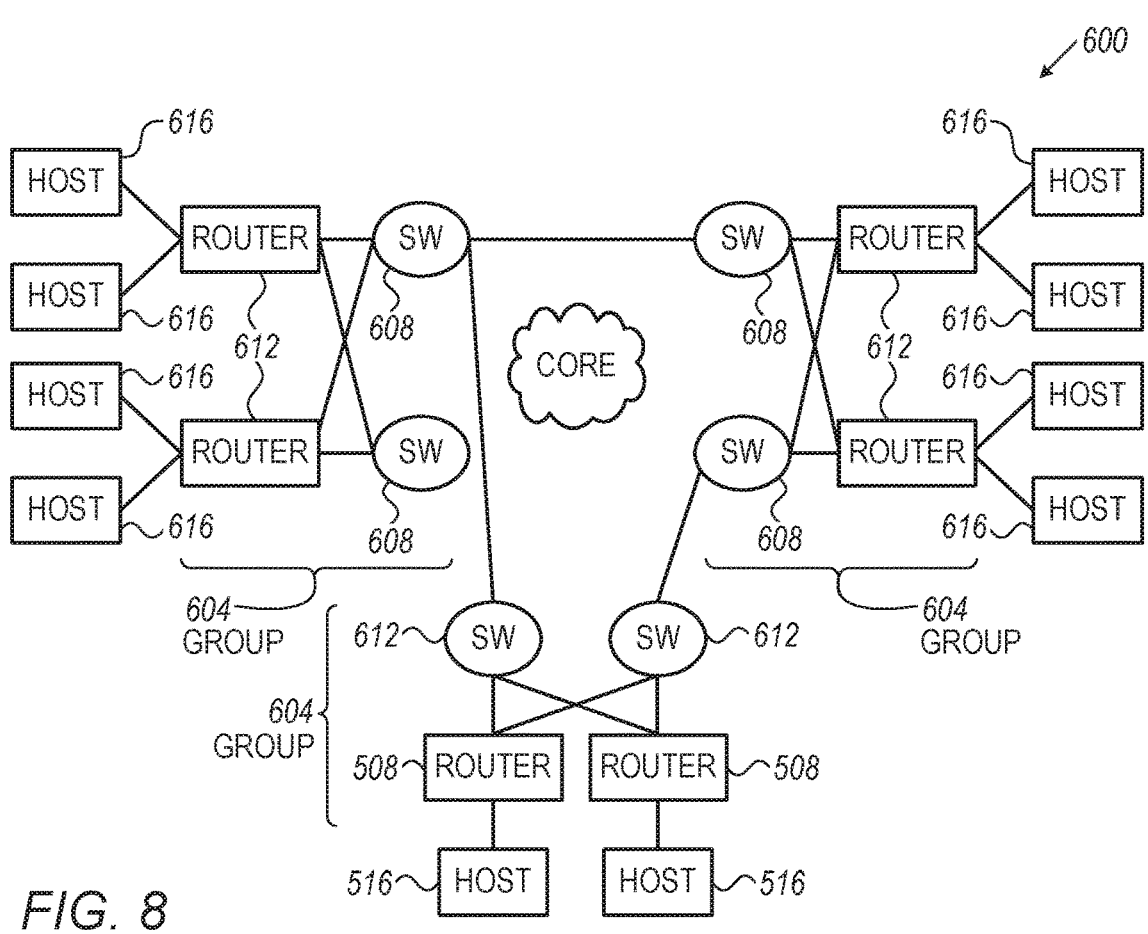

FIGS. 7 and 8 are block diagrams that schematically illustrate computing systems 500 and 600 in which a network has a Dragonfly Plus (DF+) topology, in accordance with an embodiment that is described herein.

In FIG. 7, the DF+ topology comprises multiple groups 504, wherein each group comprises two leaf switches 508 and two spine routers 512. Hosts 516 are coupled to the leaf switches. The spine routers may be implemented, for example, using router 100 of FIG. 3 above. Although the depicted topology includes three groups, in a practical application such as a datacenter, the DF+ topology may comprise hundreds or even more than a thousand groups. The number of groups depends on the number of spines per group and on the radix of the network elements. (The radix of a network element is the overall number of ports of the network element.)

In FIG. 7, each group 504 comprises a subnet, whereas spine routers 512 of multiple groups form an interconnection subnet for inter-group communication.

Hosts 516 that are coupled to a common leaf switch communicate with one another via that leaf switch. To communicate with a host coupled to another leaf switch in the group, the packet needs to pass through a spine router, but in this case the packet undergoes a regular switching function. To communicate between hosts of different groups, a packet passes a first router connected to the source group, and a second router connected to the target group (possibly via an intermediate group). Note that router-to-router forwarding is carried out using the switch interfaces 104 of the routers. The switch interfaces thus form a switching core subnet for inter-group communication.

In the example of FIG. 7, a first router that sends a packet to a second router, maps the Layer-3 address of the target host into a Layer-2 address of the second router in that group (subnet) using the ALGO2 mapping function. The second router that receives the packet from the first router maps the Layer-3 address of the target host into a layer-2 address for the packet using the ALGO1 mapping function. In some embodiments, due to a limited radix of the routers, a packet may traverse routers of multiple groups before reaching the group of the target host.

In some embodiments, a spine router in a group mediates between a subnet comprising a host coupled to a leaf of the group and other groups of the DF+ topology by connecting to a router serving as a spine in another group of the DF+ topology.

The DF+ topology in FIG. 8 is similar to that of FIG. 7, but the roles of switches and routers as spines and leaves are swapped. The DF+ topology in FIG. 8 comprises multiple groups 604, wherein each group comprises two spine switches 608 and two leaf routers 612. Hosts 616 are coupled to the leaf routers, which may be implemented, for example, using router 100 of FIG. 3 above. Although the depicted topology includes three groups, in a practical application such as a datacenter, the DF+ topology may comprise hundreds or even more than a thousand groups.

In FIG. 8, the hosts coupled to a common leaf router comprise a subnet, whereas spine switches 612 form an interconnection subnet for inter-group communication as well as for communication among leaves within a group.

Hosts 616 that are coupled to a common leaf router communicate with one another via the switch interface (104) of that leaf router. To communicate with a host in the group coupled to another leaf router in the group, the packet needs to pass through both routers and via a spine switch. In communicating between hosts of different groups, a packet passes a leaf router of the source group, a subnet comprising the spine switches and a leaf router of the target group.

In the example of FIG. 8, a first router in a source group that sends a packet to a second router in a target group, maps the Layer-3 address of the target host into a Layer-2 address of the second router in the core subnet using the ALGO2 mapping function. The second router that receives a packet from the core subnet maps the Layer-3 address of the target host into a layer-2 address for the packet using the ALGO1 mapping function.

In some embodiments a leaf router mediates between a subnet comprising a host coupled to the router, and a subnet comprising spines of the group.

Although in FIGS. 7 and 8 each group comprises two spines and two leaves, in alternative embodiments, numbers larger than two of spines and leaves can also be used.

In the example embodiments described with reference to FIGS. 5-8, an intermediate subnet mediates between other subnets or sites. In some embodiments, a host may be connected directly to that intermediate subnet. For example, in FIG. 8 a host may be connected to one of the spine switches (608). When a host 616 communicates with the host connected to spine switch 608 of the corresponding group, the leaf router (612) performs to the packet ALGO1 to reach the host (rather than ALGO2 to reach another router).

The embodiments described above are applicable to various other topologies such as Cartesian topologies. A Cartesian topology comprises multiple routers arranged in a multidimensional Cartesian grid, e.g., in a Two-Dimensional (2D) or in a Three-Dimensional (3D) Cartesian grid. One or more network nodes are typically connected to at least some of the routers. The network nodes coupled to a given router comprise a subnetwork that is reachable via the given router. Each of the routers is typically assigned a Cartesian coordinate in the grid.

One type of a Cartesian topology is a HyperX topology, in which each router connects to all other routers in each of the underlying dimensions. This means that a packet can be forwarded from a given router to any other router in a number of hops that does not exceed the dimensionality of the topology. For example, in a 3D HyperX topology, when using shortest paths, up to three hops are required to deliver a packet between any pair of routers. In general, however, the disclosed embodiments are applicable to Cartesian topologies using both shortest paths and non-shortest paths.

In some embodiments, the routers in a Cartesian topology (e.g., a HyperX topology) comprise router 100 of FIG. 3. In these embodiments, network nodes connected to different routers 100 comprise separate respective subnets. The connectivity among the routers can be viewed as a subnet comprising the switch interfaces of the routers. This architecture allows using the ALGO2 mapping for inter-router communication.

A Comparison Between the Disclosed and Conventional Routers

A comparison is made herein between the disclosed routing techniques using algorithmic address mapping and conventional routing, across multiple subnets.

Consider a packet arriving at a port of the router. The destination Layer-2 address carried in the packet header comprises the Layer-2 address assigned to the router in the subnet to which the source node belongs. Table 2 summarizes the main differences between the disclosed router (referred to herein as "DR") and a conventional router (referred to herein as "CR"). The algorithmic mapping function is denoted ALGO(•), which may be selected from among ALGO1, ALGO2 and ALGO3 as described above.

In describing Table 2, let DL3 denote the Layer-3 address of the destination node, and let DL2 denote the next-hop Layer-2 address.

TABLE 2

A comparison between the disclosed router and a conventional router

| Function/Router | Disclosed router | Conventional router |
|---|---|---|
| Layer-3 lookup | Based on ALGO (DL3) | Based on longest prefix match using DL3 |
| Layer-3 lookup result | Selected egress switch interface | Point to L3 result—e.g., ECMP, single next-hop or adjacent |
| DL2 | DL2 = ALGO (DL3) | Lookup in ARP table, can result in a miss |
| Layer-2 lookup | Based on DL2 | Based. on DL2/port selected using DL3 lookup |

In Table 2, the Address Resolution Protocol (ARP) refers to a protocol resolving Layer-3 addresses of received packets into Layer-2 addresses that can be used for local next hop forwarding within the destination subnet. In Table 2 column Layer-3 lookup result in a conventional router, the term Equal-Cost Multi-Path (ECMP) refers to a routing protocol that supports forwarding packets to a common destination over multiple possible paths. ECMP and next hop provide the IP address for which to lookup a corresponding MAC address (because it points to an additional router). In Table 2, the term "adjacent" refers to extracting a destination IP address from the IP header, and looking up for a corresponding MAC address. Note that in Ethernet networks—when looking up a MAC a Mac address fails, the router typically performs a suitable action to find the missing MAC. For example, the router may apply a subnet flooding method on a broadcast address to find the missing MAC.

Address Assignment Considerations

The embodiments described above rely on proper assignment of (i) Layer-3 addresses (e.g., GIDs) to network nodes, and (ii) Layer-2 (e.g., LIDs) addresses to switches and router ports across the network. In the present context, proper address assignment means that the assigned address is reachable by a router applying a selected mapping to the Layer-3 address of the target node. For example, consider a router coupled to a first subnet and to a second subnet that has a path to the target node. The router should be assigned a Layer-2 address in the first subnet that is derivable from the Layer-3 address of the target node.

In the description that follows, it is assumed that SMs 40, SDN controller 44, or both handle the address assignment task in the network, e.g., network 28. SMs 40 and SDN controller 44 are thus referred to herein collectively as a "management apparatus." The goal of the management apparatus is to assign Layer-3 addresses to respective network nodes, and to further assign Layer-2 addresses to respective network nodes, switches and routers in the network. In some embodiments, for efficient forwarding, the management apparatus assigns "floating LIDs" to respective groups of routers.

To this end, it is assumed that the management apparatus receives information regarding the topology of the network and uses this information for assigning the addresses. The topology information may be indicative of sites, subnets and target nodes that are accessible by each router. The description that follows focuses on assigning Layer-2 address to router ports and to network nodes that are reachable from other routers using address mapping.

Consider a first subnetwork coupled via a given router to a second subnetwork. Assuming, that the management apparatus is implemented using SDN controller 44, the management apparatus comprises processor (48) and an interface (46) connected to the first subnetwork. Alternatively, the management apparatus may be implemented within one or more SMs 40 using processor 42 and interface 41. Further alternatively, the management apparatus comprises one or more processors selected from among processor 48 of the SDN controller and processors 42 of the SMs.

The processor (e.g., 48) receives via the network interface information indicative of subnetworks that are accessible via the given router. Such information may be reported by the given router and/or by other routers. Using the information, the processor assigns a Layer-2 address to a port via which the given router connects to the first subnetwork, wherein the Layer-2 addresses is derivable by applying a mapping to a Layer-3 address of a given target node accessible via the given router. The processor may generate the Layer-2 address based on the subnet prefix of the subnet to which the given router connects.

Note that in some embodiments, processor 48 defines a group of multiple routers and assigns a floating Layer-2 address to the multiple routers in this group.

In some embodiments, the first and the second subnetworks belong to a common site, and the mapping maps a subnet identifier field in the Layer-3 address of the given target node to the Layer-2 address. In other embodiments, the first and second subnetworks belong to different sites, and the mapping maps a site identifier field in the Layer-3 address of the given target node to the Layer-2 address. As noted above, in an embodiment, processor 48 may define a group of multiple routers and assign a floating Layer-2 address common to the multiple routers in this group.

The configurations of computing system 20, SM 40 and SDN controller 44 in FIG. 1, as well as router 100 in FIG. 3 and computing systems 300, 400, 500 and 600 in FIGS. 5-8, are given by way of example, and other suitable computing systems, router, SM and SDN controller configurations can also be used.

Some elements of router 100, such as switch interfaces 104, pre-logic 116, routing tables 120, algo mapping 124, forwarding module 128, switch interfaces 104 and router controller 130 may be implemented in hardware, e.g., in one or more Application-Specific Integrated Circuits (ASICs) or Field-Programmable Gate Arrays (FPGAs). Additionally or alternatively, some elements of the network element can be implemented using software, or using a combination of hardware and software elements.

Elements that are not necessary for understanding the principles of the present application, such as various interfaces, addressing circuits, timing and sequencing circuits and debugging circuits, have been omitted from FIGS. 1, 3, and 5-8 for clarity.

In some embodiments, some of the functions of router 100 (e.g., router controller 130), SM 40 (e.g., processor 42), and/or SDN controller 44 (e.g., processor 48) may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the present context and in the claims, elements of router 100, excluding ports 108 are referred to collectively "routing circuitry." In the example of FIG. 3, the routing circuitry comprises switch interfaces 104, pre-logic 116, routing table 120, algo mapping module 124, forwarding module 128 and routing controller 130.

The embodiments described above are given by way of example, and other suitable embodiments can also be used.

Although the embodiments described herein mainly address efficient routing in applications such as datacenters and supercomputers, the methods and systems described herein can also be used in other applications, such as in compute pods having shared storage pods.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A router, comprising:
a plurality of ports; and
routing circuitry, to:
receive from a first subnetwork, via one of the ports, a packet destined to be delivered to a target node located in a second subnetwork;
select an algorithmic mapping function, from among two or more different algorithmic mapping functions that are used within the router for locally mapping Layer-3 addresses into Layer-2 addresses, depending on a topological relation between the first subnetwork and the second subnetwork;
map a Layer-3 address of the packet into a Layer-2 address by applying the selected algorithmic mapping function to the Layer-3 address; and
forward the packet via another one of the ports to the Layer-2 address.

2. The router according to claim 1, wherein the routing circuitry is to:
select a first algorithmic mapping function when the first subnetwork is connected directly by the router to the second subnetwork; and
select a second algorithmic mapping function, different from the first algorithmic mapping function, when at least one intermediate subnetwork separates between the first subnetwork and the second subnetwork.

3. The router according to claim 2, wherein the routing circuitry is to select the first algorithmic mapping function by selecting an algorithmic mapping function that maps the Layer-3 address into a Layer-2 address preassigned to the target node in the second subnetwork.

4. The router according to claim 2, wherein the router connects via an intermediate subnetwork to an intermediate router that connects to the second subnetwork, wherein the routing circuitry is to select the second algorithmic mapping function by selecting an algorithmic mapping function that maps a subnet-prefix of the Layer-3 address to a Layer-2 address preassigned to the intermediate router in the intermediate subnetwork.

5. The router according to claim 2, wherein the first subnetwork and the second subnetwork reside in different sites, and wherein the routing circuitry is to select a third mapping by selecting an algorithmic mapping function that maps a site identifier of the Layer-3 address to a Layer-2 address preassigned to the intermediate router in the intermediate subnetwork.

6. The router according to claim 1, wherein the routing circuitry is to receive another packet to be delivered to the first subnetwork, and to forward the another packet to a Layer-2 address in the first subnetwork, carried in the another packet.

7. The router according to claim 1, wherein the router comprises an L3-forwarding circuit comprising a routing table that provides access to the two or more algorithmic mapping functions, wherein the L3-forwarding circuit is to select the algorithmic mapping function by accessing the routing table using selected bits of the Layer-3 address.

8. The router according to claim 1, wherein the router further comprises: (i) multiple switch interfaces respectively connected to multiple subnetworks, and (ii) a routing table that stores identifiers of the multiple switch interfaces, and wherein the routing circuitry is to receive a given packet from a given subnetwork via a given switch interface, to select another switch interface connected to another subnetwork by accessing the routing table using selected bits of the Layer-3 address, and to forward the given packet to the another subnetwork via the another switch interface.

9. The router according to claim 1, wherein the router is assigned to serve as a spine in a group of a Dragonfly Plus (DF+) topology, the group comprising interconnected spines and leaves, and wherein the routing circuitry is to mediate between a subnet comprising a host coupled to a leaf of the group and other groups of the DF+ topology by connecting to a router serving as a spine in another group of the DF+ topology.

10. The router according to claim 1, wherein the router is assigned to serve as a leaf in a group of a DF+ topology, the group comprising interconnected spines and leaves, and wherein the routing circuitry is to mediate between a subnet comprising a host coupled to the router, and a subnet comprising spines of the group and of other groups of the DF+ topology.

11. The router according to claim 1, wherein the router connects to the second subnetwork via a hierarchy of subnetworks having two or more levels, wherein the router is to determine the Layer-2 address of the next-hop router by applying the second algorithmic mapping function to a subnet-prefix field in the packet, wherein the subnet-prefix contains partial subgroups of bits that are used by other routers downstream the hierarchy for determining Layer-2 addresses using the second algorithmic mapping function.

12. The router according to claim 1, wherein the router is coupled to multiple other routers in a Cartesian topology, and wherein network nodes coupled to the router and to the other routers serve as respective subnetworks.

13. A method for routing, comprising:
in a router comprising a plurality of ports, receiving from a first subnetwork, via one of the ports, a packet destined to be delivered to a target node located in a second subnetwork;
selecting an algorithmic mapping function, from among two or more different algorithmic mapping functions that are used within the router for locally mapping Layer-3 addresses into Layer-2 addresses, depending on a topological relation between the first subnetwork and the second subnetwork;

mapping a Layer-3 address of the packet into a Layer-2 address using by applying the selected algorithmic mapping function to the Layer-3 address; and forwarding the packet via another one of the ports to the Layer-2 address.

14. The method according to claim 13, wherein selecting the algorithmic mapping function comprises selecting a first algorithmic mapping function when the first subnetwork is connected directly by the router to the second subnetwork, and selecting a second algorithmic mapping function, different from the first algorithmic mapping function, when at least one intermediate subnetwork separates between the first subnetwork and the second subnetwork.

15. The method according to claim 14, wherein selecting the first algorithmic mapping function comprises selecting an algorithmic mapping function that maps the Layer-3 address into a Layer-2 address preassigned to the target node in the second subnetwork.

16. The method according to claim 14, wherein the router connects via an intermediate subnetwork to an intermediate router that connects to the second subnetwork, and wherein selecting the second algorithmic mapping function comprises selecting an algorithmic mapping function that maps a subnet-prefix of the Layer-3 address to a Layer-2 address preassigned to the intermediate router in the intermediate subnetwork.

17. The method according to claim 14, wherein the first subnetwork and the second subnetwork reside in different sites, and wherein selecting the algorithmic mapping function comprises selecting a third algorithmic mapping function that maps a site identifier of the Layer-3 address to a Layer-2 address preassigned to the intermediate router in the intermediate subnetwork.

18. The method according to claim 13, and comprising receiving another packet to be delivered to the first subnetwork, and forwarding the another packet to a Layer-2 address in the first subnetwork, carried in the another packet.

19. The method according to claim 13, wherein the router comprises an L3-forwarding circuit comprising a routing table that provides access to the two or more algorithmic mapping functions, and wherein selecting the algorithmic mapping function comprises accessing the routing table using selected bits of the Layer-3 address.

20. The method according to claim 13, wherein the router comprises: (i) multiple switch interfaces respectively connected to multiple subnetworks, and (ii) a routing table that stores identifiers of the multiple switch interfaces, and wherein the method further comprising receiving a given packet from a given subnetwork via a given switch interface, selecting another switch interface connected to another subnetwork by accessing the routing table using selected bits of the Layer-3 address, and forwarding the given packet to the another subnetwork via the another switch interface.

21. The method according to claim 13, wherein the router is assigned to serve as a spine in a group of a Dragonfly Plus (DF+) topology, the group comprising interconnected spines and leaves, and wherein the method further comprising mediating between a subnet comprising a host coupled to a leaf of the group and other groups of the DF+ topology by connecting to a router serving as a spine in another group of the DF+ topology.

22. The method according to claim 13, wherein the router is assigned to serve as a leaf in a group of a DF+ topology, the group comprising interconnected spines and leaves, and wherein the method further comprising mediating between a subnet comprising a host coupled to the router, and a subnet comprising spines of the group and of other groups of the DF+ topology.

23. The method according to claim 13, wherein the router connects to the second subnetwork via a hierarchy of subnetworks having two or more levels, wherein mapping the Layer-3 address into the Layer-2 address comprises determining the Layer-2 address of the next-hop router by applying the second algorithmic mapping function to a subnet-prefix field in the packet, wherein the subnet-prefix contains partial subgroups of bits that are used by other routers downstream the hierarchy for determining Layer-2 addresses using the second algorithmic mapping function.

24. The method according to claim 13, wherein the router is coupled to multiple other routers in a Cartesian topology, and wherein network nodes coupled to the router and to the other routers serve as respective subnetworks.

25. A management apparatus, comprising:
an interface, to connect to a first subnetwork that is coupled via a router to a second subnetwork that has a path to a given network node; and
one or more processors to:
receive via the interface information indicative of subnetworks and of target nodes that are accessible via the router; and
using the information, select between a first algorithmic mapping function that maps subnet identifier fields of Layer-3 addresses to Layer-2 addresses, and a second algorithmic mapping function that maps site identifier fields of Layer-3 addresses to the Layer-2 addresses, depending on whether or not the first and second subnetworks belong to a common site or to different sites;
derive a Layer-2 address by applying the selected algorithmic mapping function to the Layer-3 address of the given network node; and
assign the derived Layer-2 address to a port via which the router connects to the first subnetwork.

26. A method comprising:
in an apparatus connected to a first subnetwork that is coupled via a router to a second subnetwork that has a path to a given network node, receiving by one or more processors, information indicative of subnetworks and of target nodes that are accessible via the router;
using the information, selecting between a first algorithmic mapping function that maps subnet identifier fields of Layer-3 addresses to Layer-2 addresses, and a second algorithmic mapping function that maps site identifier fields of Layer-3 addresses to the Layer-2 addresses, depending on whether or not the first and second subnetworks belong to a common site or to different sites;
deriving a Layer-2 address by applying the selected algorithmic mapping function to the Layer-3 address of the given network node; and
assigning the Layer-2 address to a port via which the router connects to the first subnetwork.

* * * * *